United States Patent [19]
Kitagishi et al.

[11] Patent Number: 5,537,168
[45] Date of Patent: Jul. 16, 1996

[54] PROJECTION OPTICAL APPARATUS COMPRISING AUTOMATIC ADJUSTMENT UNIT

[75] Inventors: Nozomu Kitagishi, Hachioji; Shoji Suzuki; Shuichiro Saito, both of Yokohama; Masaharu Suzuki, Kawasaki; Koutaro Yano, Yokohama; Toru Matsuda, Tokyo; Makoto Taniguchi, Kawasaki, all of Japan

[73] Assignee: Canon Kabushiki Kaisha, Tokyo, Japan

[21] Appl. No.: 327,803

[22] Filed: Oct. 24, 1994

Related U.S. Application Data

[63] Continuation of Ser. No. 872,987, Apr. 24, 1992, abandoned.

[30] Foreign Application Priority Data

| Apr. 26, 1991 | [JP] | Japan | 3-097253 |
| Jul. 18, 1991 | [JP] | Japan | 3-178374 |
| Aug. 29, 1991 | [JP] | Japan | 3-218660 |
| Sep. 18, 1991 | [JP] | Japan | 3-238083 |
| Oct. 30, 1991 | [JP] | Japan | 3-284836 |
| Nov. 11, 1991 | [JP] | Japan | 3-294302 |
| Nov. 11, 1991 | [JP] | Japan | 3-294303 |
| Nov. 28, 1991 | [JP] | Japan | 3-314859 |

[51] Int. Cl.⁶ .................................................. G03B 21/53
[52] U.S. Cl. ............................................ 353/101; 353/69
[58] Field of Search ........................... 353/101, 100, 353/31, 33, 34, 37, 69, 81, 122, 81; 359/820, 819, 823, 40, 554; 250/201.2, 201.4, 201.7, 201.8

[56] References Cited

U.S. PATENT DOCUMENTS

| 3,414,352 | 12/1968 | Johannsen | 353/101 |
| 3,469,925 | 9/1969 | Urback et al. | 353/101 |
| 3,538,830 | 11/1970 | Henriksen | 353/101 |
| 3,628,857 | 12/1971 | Harvey | 353/101 |
| 3,635,551 | 1/1972 | Szymber | 353/101 |
| 3,856,392 | 12/1974 | Harrison | 353/101 |
| 4,386,833 | 6/1983 | Hirose | 353/67 |
| 4,415,244 | 11/1983 | Daly et al. | 353/101 |
| 4,494,835 | 1/1985 | Hamid et al. | 351/158 |
| 4,560,999 | 12/1985 | Tokuhara | 346/160 |
| 4,861,975 | 8/1989 | Kino et al. | 250/201.4 |
| 4,988,188 | 1/1991 | Ohta | 353/122 |
| 4,989,076 | 1/1991 | Owada et al. | 358/61 |
| 5,096,288 | 3/1992 | Yano et al. | 353/69 |
| 5,105,075 | 4/1992 | Ohta et al. | 353/101 |
| 5,107,293 | 4/1992 | Sekine et al. | 359/554 |
| 5,136,397 | 8/1992 | Miyashita | 358/236 |
| 5,153,752 | 10/1992 | Kurematsu et al. | 359/40 |
| 5,170,194 | 12/1992 | Kurematsu et al. | 353/52 |
| 5,237,435 | 8/1993 | Kurematsu et al. | 359/41 |
| 5,267,029 | 11/1993 | Kurematsu et al. | 358/60 |
| 5,276,523 | 1/1994 | Kurematsu et al. | 358/236 |

FOREIGN PATENT DOCUMENTS

| 47-19077 | 6/1972 | Japan . |
| 61-13885 | 1/1986 | Japan . |
| 62-125791 | 8/1987 | Japan . |
| 63-106785 | 5/1988 | Japan . |
| 63-253342 | 10/1988 | Japan . |
| 1204010 | 8/1989 | Japan . |

*Primary Examiner*—Thomas B. Will
*Assistant Examiner*—William C. Dowling
*Attorney, Agent, or Firm*—Fitzpatrick, Cella, Harper & Scinto

[57] ABSTRACT

In a projection type display apparatus for illuminating a projection original image with light from a projection light source, and projecting light transmitted through the illuminated original image using a projection lens, light reflected by a projection surface is extracted from a position at an original image side of the projection lens or in the projection lens, and the extracted light is received by a focus detection unit.

15 Claims, 25 Drawing Sheets

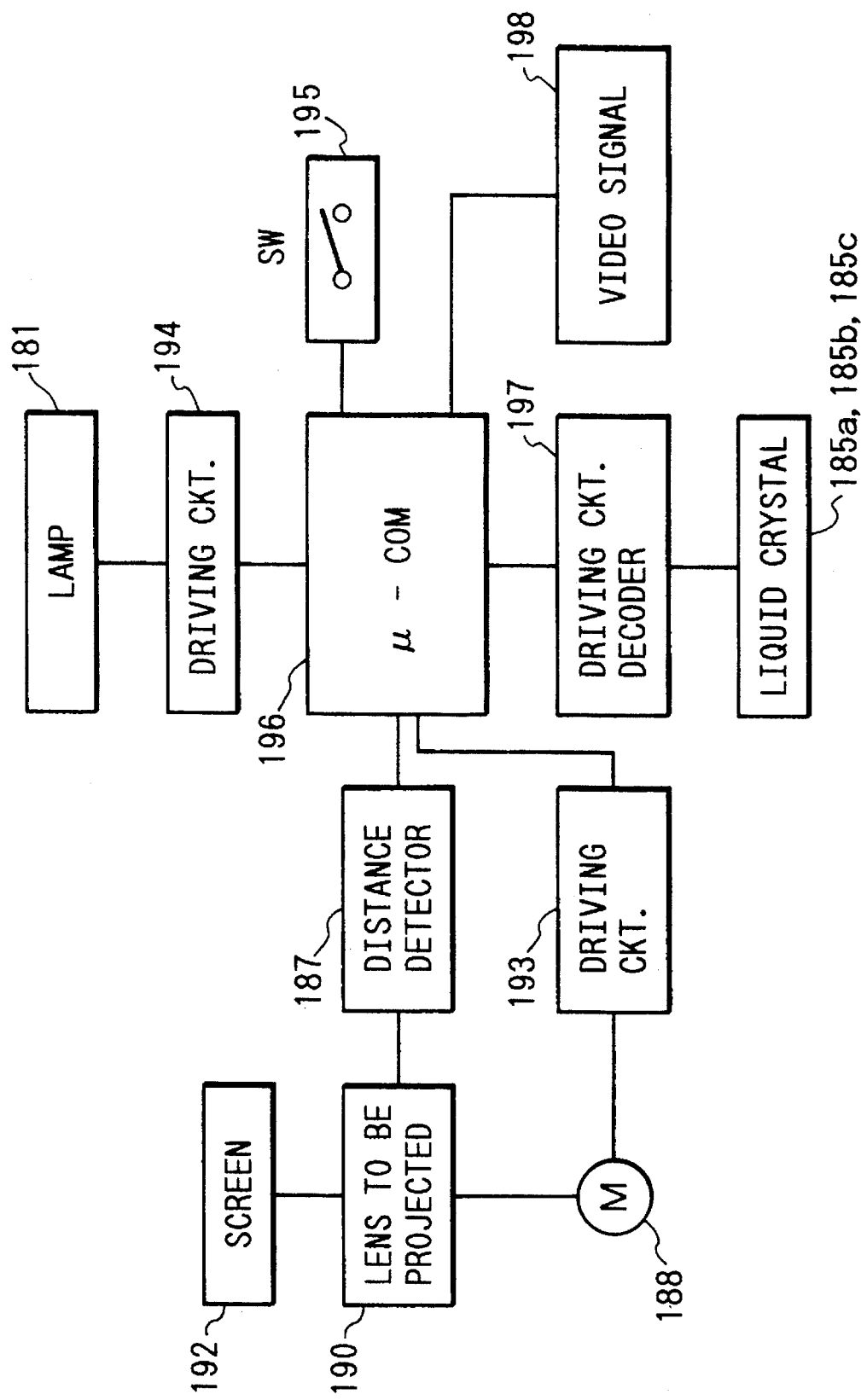

PROJECTION OPTICAL APPARATUS COMPRISING AUTOMATIC ADJUSTMENT UNIT

This application is a continuation of application Ser. No. 07/872,987, filed Apr. 24, 1992, now abandoned.

BACKGROUND OF THE INVENTION

1. Field of the Invention

The present invention relates to an apparatus for projecting a slide or video image onto a screen to display it and, more particularly, to an apparatus which can automatically and satisfactorily maintain a good focusing state of an image on a screen, and is started when the apparatus is set.

2. Related Background Art

Conventionally, projection type display apparatuses such as a slide projector and the like are known. In recent years, some projection type display apparatuses form an original image to be projected using, e.g., a liquid crystal light valve.

In these projection type display apparatuses, in order to release a user from a cumbersome focusing operation, a system in which a focus detector is arranged outside the projection type display apparatus to automatically perform a focusing operation is also known.

However, this system suffers from the following problem. That is, a focus detection projection light source must be separately arranged. In addition, since the system is often used in a state wherein the screen is arranged not to be perpendicular to the optical axis of a projection lens, when a focus detection position on the screen is separated away from the optical axis position, focus detection cannot be normally performed.

The system has a structure that can prevent a projection lens from being adversely influenced by, e.g., heat from a light source. However, when the system is used for a long period of time, the refractive index of the projection lens changes due to heat, and the focal point position may be moved. The system cannot properly cope with such a problem.

A conventional projection apparatus such as a slide projector, an overhead projector, or the like generally employs a manual focusing apparatus. In this focusing apparatus, an arbitrary photographing magnification is set, and thereafter, the focusing operation of a photographing lens is manually performed to attain an in-focus state. On the other hand, as an automatic focusing apparatus for a projection apparatus, Japanese Patent Application No. 47-19077 proposes a system shown in FIG. 48 as an auto-focus system for a slide projector.

In this slide projector, as shown in FIG. 48, a slide film 2 is arranged on the focal plane of a projection lens 1, and an image on the film 2 is projected onto a projection surface 3 arranged on the front surface of a photographing lens. In this arrangement state, in only the first projection operation, the projection lens 1 is moved in the optical axis direction to perform a focusing operation, so that an image is focused on the projection surface 3. A light source unit 4 and a light-receiving unit 5 are arranged on two sides of the film 2, so that a light flux emitted from the light source unit 4 is reflected by the surface of the film 2, and is incident on the light-receiving unit 5. The light-receiving unit 5 can detect the position of the incident light flux, and stores the position of the light flux reflected by the surface of the film 2 as an in-focus position of the film when the projection lens 1 is initially moved in the optical axis direction to perform the focusing operation. When another film is set, the position of a light flux reflected by the surface of this film is detected, and when the detected position is different from the stored film in-focus position, the film 2 is moved in the optical axis direction by a film position driving device 6 to adjust the detected position to the stored film in-focus position. With the above-mentioned operation, when films are changed, an in-focus state can be automatically maintained.

Japanese Laid-Open Patent Application No. 1-204010 proposes a focus system in which a light projection/receiving device having a special-purpose optical system for focus detection is arranged to measure a distance to a projection surface in addition to a focusing optical system for projecting an image reproduced on a liquid crystal surface onto the projection surface, and the focusing optical system for projecting an image reproduced on the liquid crystal surface onto the projection surface is adjusted based on the data to obtain an in-focus state.

A projector as a typical projection type display apparatus may have an arrangement shown in FIG. 50. In FIG. 50, the projector comprises a light source 11, an object 12 to be projected, a screen 19, a driving system 15 for driving a projection lens 16, and a motor 14 for driving the driving system 15. In order to perform focus adjustment, light projected by a light projection/receiving unit 18 is reflected by a half mirror 13, and is projected onto the screen 19 through the projection lens. Furthermore, the projected light is reflected by the screen 19, and is measured by the light projection/receiving unit 18 along the same optical path.

In order to stabilize a projected image, the focus adjustment is performed when a power switch is turned on or when an auto-focus switch is operated.

However, in the above-mentioned prior art, when the temperature of the projection lens changes during projection, and the focal point position is shifted, the auto-focus switch must be operated, resulting in cumbersome operations.

As one kind of optical equipment, a projection apparatus which incorporates an auto-focus device is known. As an invention associated with such a projection apparatus, the invention described in Japanese Laid-Open Patent Application No. 1-204010 is known. The invention of this application allows a simple operation of the projection apparatus with the auto-focus device. That is, an auto-focus operation is performed by detecting that the projection apparatus is set.

However, once the above-mentioned projection apparatus is set, if a person touches and moves the apparatus, the focusing operation must be manually performed. Therefore, the apparatus is not easy to operate or use, and automatic functions are not satisfactory.

SUMMARY OF THE INVENTION

It is the first object of the present invention to provide a projection optical apparatus which is easy to use upon operation of an automatic adjustment unit.

It is the second object of the present invention to provide an apparatus which can satisfactorily maintain a good focusing state of a projected image.

It is the third object of the present invention to provide an apparatus which can project a bright projection image onto a screen.

It is the fourth object of the present invention to provide an apparatus, which can be started when the apparatus is properly set.

Other objects of the present invention will be apparent from the following detailed description of the preferred embodiments.

BRIEF DESCRIPTION OF THE DRAWINGS

FIG. 41 is a block diagram;

DETAILED DESCRIPTION OF THE PREFERRED EMBODIMENTS

Figure 1:
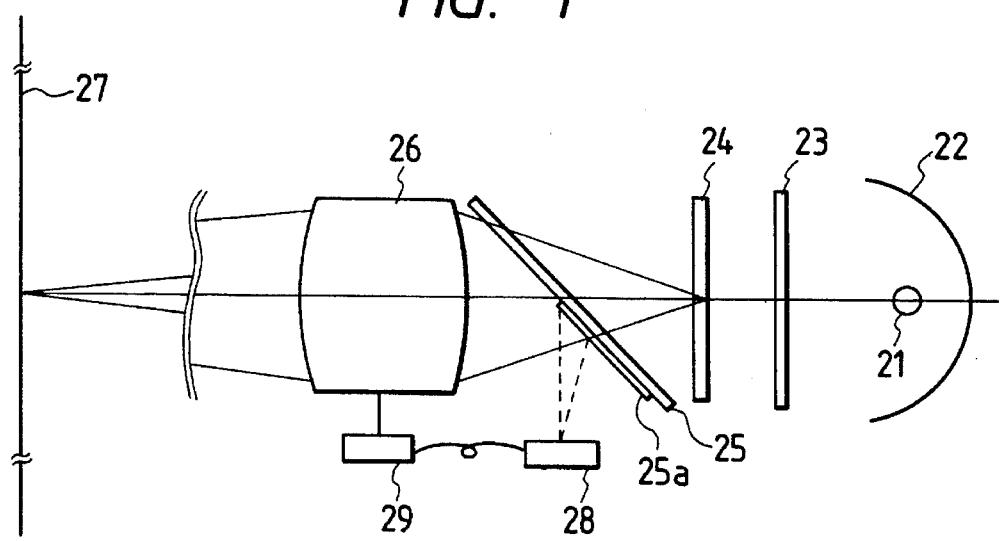
FIG. 1 is an optical sectional view showing a first embodiment of the present invention.
Figure 2:
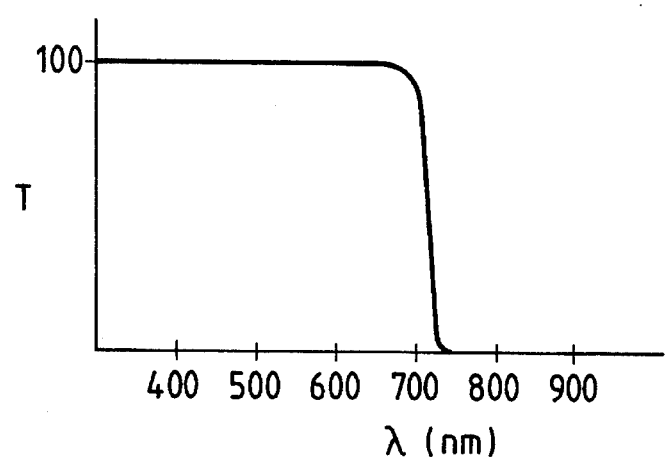
FIG. 2 is a graph showing transmission spectral characteristics.

FIG. 1 illustrates the first embodiment of the present invention.

Figure 3:
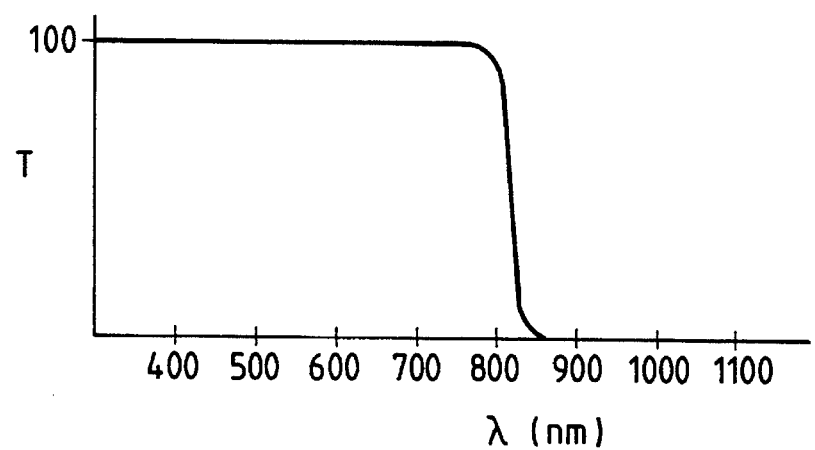
FIG. 3 is a graph showing transmission spectral characteristics.
Figure 4:
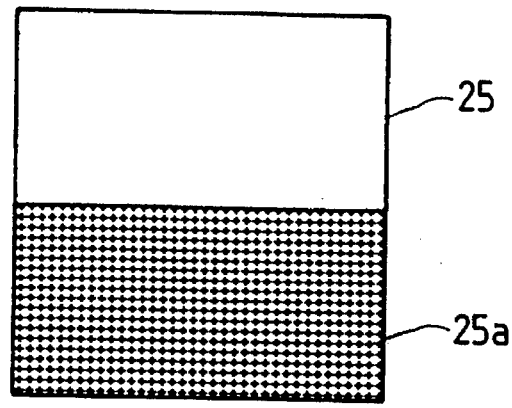
FIG. 4 is a front view showing a coating region of a constituting element.

A projection light source 21 preferably comprises a halogen lamp or a metal halide lamp. A reflector 22 comprises a concave spherical mirror or an elliptic mirror. A heat cut filter 23 has spectral transmission characteristics, as shown in FIG. 3. That is, the filter 28 transmits visible light and near infrared light (in a wavelength range between 400 nm and 800 nm), but cuts radiation exceeding this range so as to prevent a projection original image from being thermally damaged. A projection original image 24 comprises, e.g., a liquid crystal light valve. The liquid crystal light valve displays a video image. A beam splitter 25 has a pattern, as shown in, e.g., FIG. 4. The upper half of the surface of the splitter 25 has spectral transmission characteristics for transmitting visible light and near infrared light, and the lower half thereof corresponds to a coating region 25a having spectral characteristics for transmitting visible light in a wavelength range between 400 nm and 700 nm, and reflecting near infrared light in a wavelength range between 700 nm and 800 nm, as shown in FIG. 4. A projection lens 26 is constituted by a plurality of elementary lenses in practice although it is illustrated like a block. The projection lens 26 projects an image of the projection original image 24 onto an arbitrary screen 27.

A focus detector 28 is arranged to receive light components, reflected by the region 25a, of a light flux which is reflected by the screen 27, and is transmitted through the projection lens 26 in the reverse incident direction. The focus detector 28 may comprise a conventional focus detector for detecting a defocused state of an image, or may comprise a conventional focus detector for detecting a shift between two images using a pupil-split optical system to detect a focal point.

A focus adjustment unit (lens driving device) 29 is assembled with a signal processing and driving circuit, and an actuator, and performs focus adjustment of the projection lens 26 according to the output from the focus detector 28. Light emitted from the projection light source 21 is incident on the filter 23, and only visible light and near infrared light (in the wavelength range between 400 nm to 800 nm) are transmitted through the filter 23, thereby illuminating the projection original image 24. Light emerging from the projection original image 24 is incident on the beam splitter 25. Visible light in the wavelength range between 400 nm and 700 nm is transmitted through the entire surface of the beam splitter 25 without any influence, but near infrared light in the wavelength range between 700 nm to 800 nm is cut by the lower half region of the beam splitter 25 and is transmitted through the upper half region thereof.

The projection original image 24 is projected with the above-mentioned light onto the screen 27 by the projection lens 26. Light diffused and reflected by the screen 27 is transmitted through the projection lens 26, and is incident on the beam splitter 25 again. Only near infrared light in the wavelength range between 700 nm and 800 nm is reflected by the lower half region of the beam splitter 25, and the reflected light is guided to the focus detector 28 to perform focus detection. Furthermore, the projection lens 26 is driven by the lens driving device 29 according to the output signal from the focus detector 28, thereby performing focus adjustment.

When a method of performing focus detection through a projection lens is applied to a projection type display apparatus, since a beam splitter for guiding light to a focus detector is arranged in the optical path of light to be projected, the projected image becomes undesirably dark. However, according to the optical system of this embodiment, a method of detecting a focal point through a projection lens without decreasing the brightness of an image to be projected in an auto-focus device using the projection light source 21 as a projection light source can be applied to a projection type display apparatus. When the projection type display apparatus has this arrangement, a light-receiving unit of the focus detector 28 need only be set at a position conjugate with the projection original image 24 with respect to the projection lens 26. Once the apparatus is set, even when the refractive index of the projection lens changes due to heat from the light source, and the focal point position is moved, or even when the lens suffers from misalignment, a defocusing state between the auto-focus device and the projection lens can be prevented.

Figure 5:
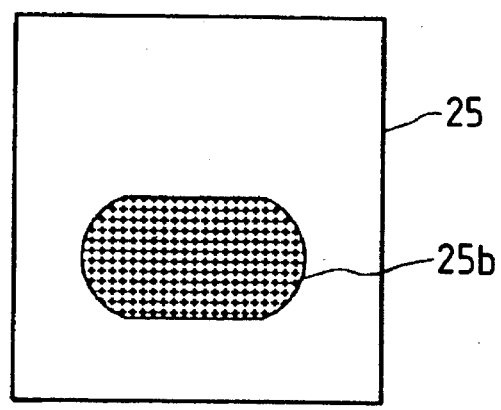
FIG. 5 is a front view showing the coating region of the constituting element.
Figure 6:
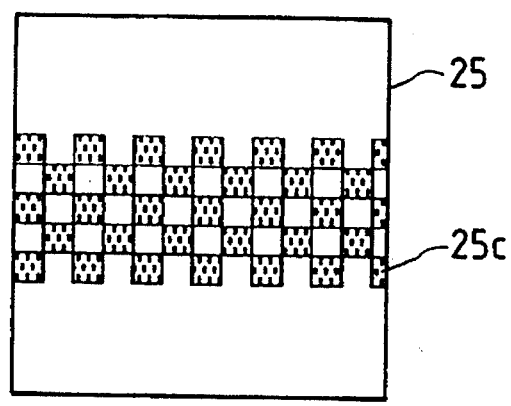
FIG. 6 is a front view showing the coating region of the constituting element.

The coating region 25a for reflecting near infrared light in the wavelength range between 700 nm and 800 nm of the beam splitter 25 may have an elongated pattern at a position slightly below the central portion of the beam splitter 25, as shown in FIG. 5, in addition to the pattern shown in FIG. 4. Alternatively, the coating region 25a may have a checkerboard pattern at the central portion of the beam splitter 25, as shown in FIG. 6. Alternatively, the beam splitter 25 may have a half-mirror coating on its entire surface for transmitting visible light, and half-transmitting near infrared light in the wavelength range between 700 nm and 800 nm.

In this embodiment, the beam splitter 25 is arranged nearer the original image 24 than the projection lens 26. In some cases, however, for the sake of the arrangement of the apparatus, or miniaturization, or aberration correction, a large space is formed in the lens. In this case, it is often preferable to arrange the beam splitter 25 in the projection lens. In this arrangement, a lens portion nearer the light source than the beam splitter 25 must be designed so that a synthesized refracting power is not changed by heat, or must have a refracting power weak enough not to influence the entire refracting power even if this lens portion is influenced by the heat.

Figure 7:
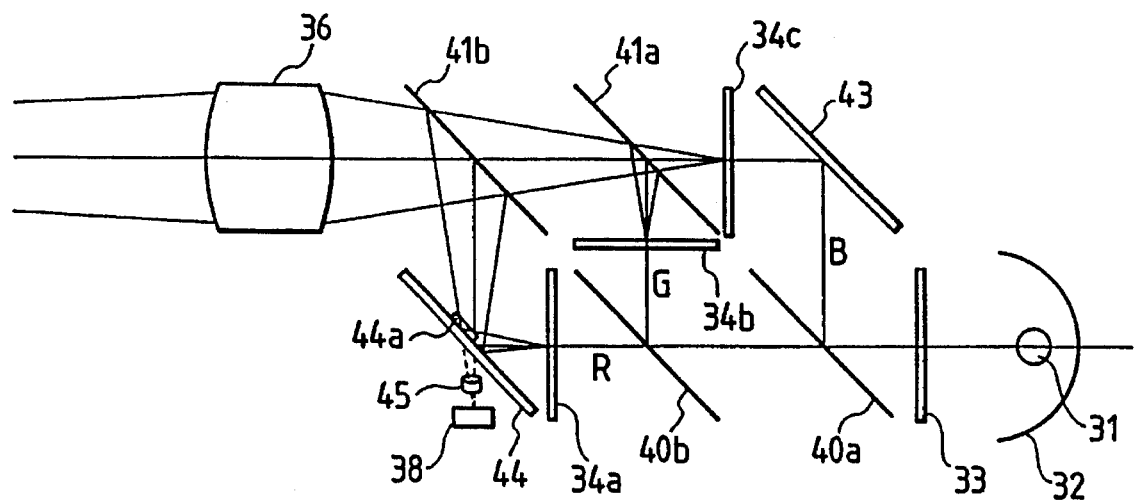
FIG. 7 is an optical sectional view showing a second embodiment of the present invention.

FIG. 7 shows another embodiment of the present invention, wherein the present invention is applied to a three-plate type liquid crystal projector.

Figure 8:
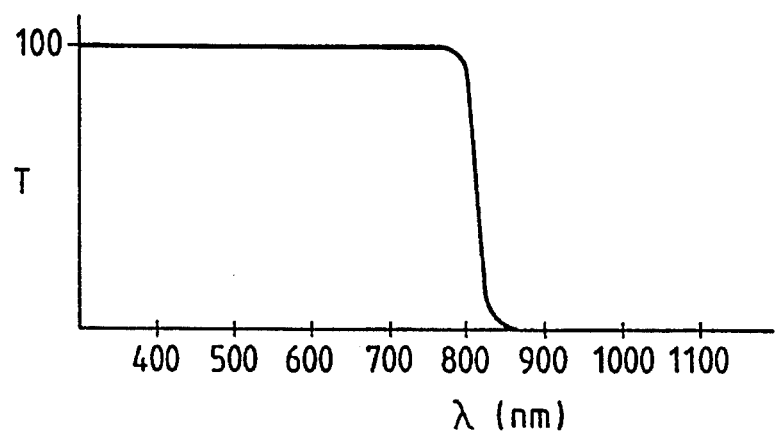
FIG. 8 is a graph showing transmission spectral characteristics.

A projection light source 31 such as a halogen lamp or a metal halide lamp, a reflector 32, and a filter 33 are arranged in order. The filter has spectral transmission characteristics for transmitting light in a wavelength range between 400 nm and 800 nm, as shown in FIG. 8, i.e., visible light and near infrared light, and filtering out radiation exceeding the wavelength range so as to prevent a projection original image from being thermally damaged.

Figure 9:
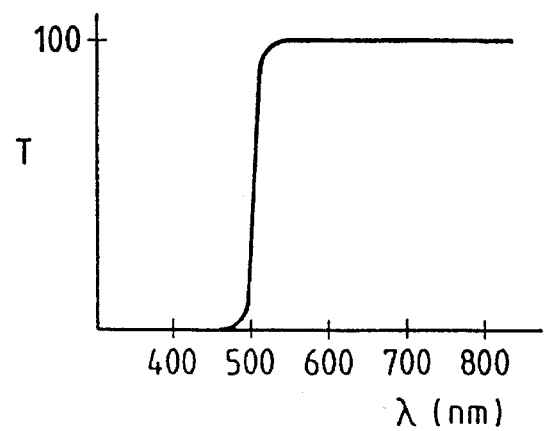
FIG. 9 is a graph showing transmission spectral characteristics.
Figure 10:
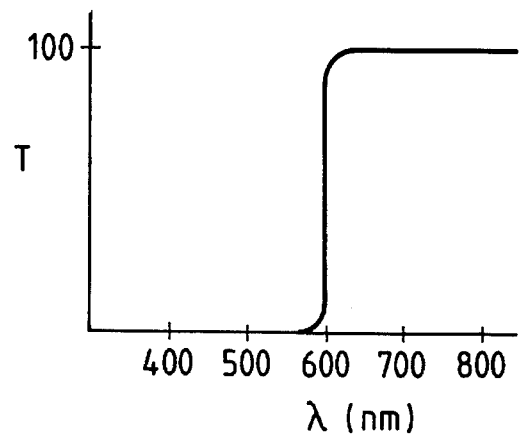
FIG. 10 is a graph showing transmission spectral characteristics.

A color separation system includes a dichroic mirror 40a having spectral characteristics, as shown in FIG. 9, for transmitting red light and green light, and reflecting blue light, a dichroic mirror 40b having spectral characteristics, as shown in FIG. 10, for transmitting red light and reflecting green light, and a total reflection mirror 43.

Figure 11:
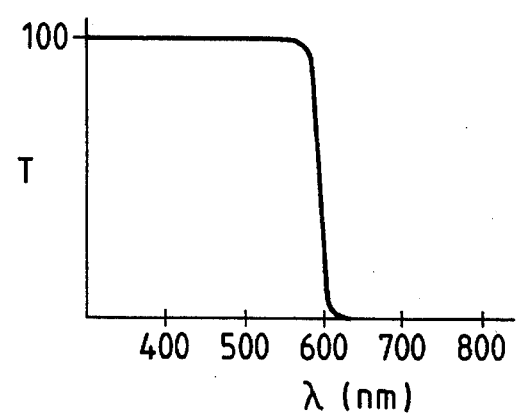
FIG. 11 is a graph showing transmission spectral characteristics.
Figure 12:
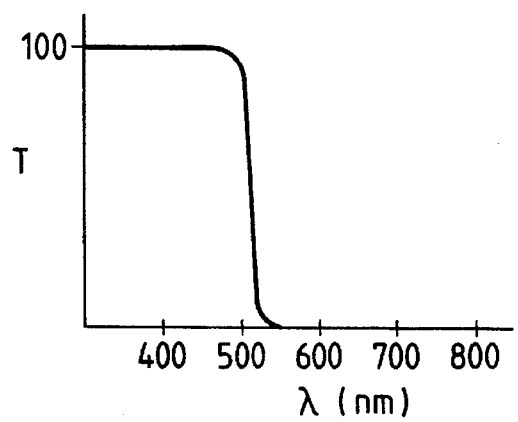
FIG. 12 is a graph showing transmission spectral characteristics.
Figure 13:
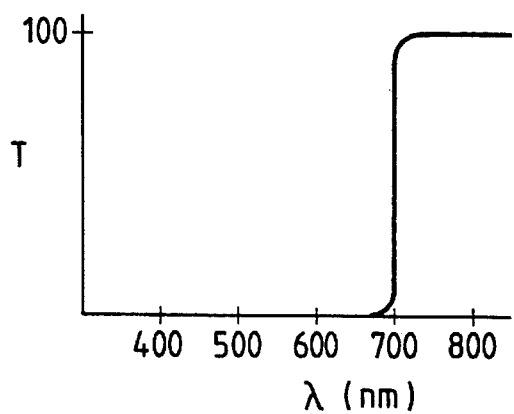
FIG. 13 is a graph showing transmission spectral characteristics.
Figure 14:
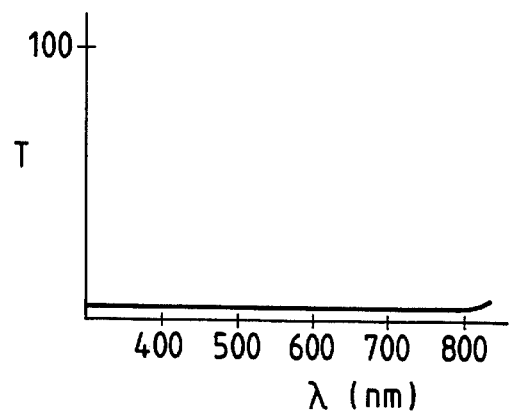
FIG. 14 is a graph showing transmission spectral characteristics.

Projection original images 34a, 34b, and 34c of liquid crystal light valves respectively correspond to red, green, and blue light components. A dichroic mirror 41a, constituting a color mixing system, for transmitting blue light, and reflecting green light has spectral characteristics, as shown in FIG. 12. A dichroic mirror 41b for transmitting blue light and green light, and reflecting red light has spectral characteristics, as shown in FIG. 11. A beam splitter 44 has a coating region 44a, which is formed slightly above the central portion of a total reflection mirror having flat spectral characteristics illustrated in FIG. 14, and has spectral characteristics shown in FIG. 13 for transmitting near infrared light in a wavelength range between 700 nm and 800 nm, and reflecting visible light and reflection light in a wavelength range between 400 nm and 700 nm.

The projector also includes a projection lens 36, a focus detector 38, and a convergent lens 45 for focusing a light flux at a nearer position.

Of light emitted from the projection light source, visible light in the wavelength range between 400 nm and 700 nm is separated into three R, G, and B color light components by the dichroic mirrors 40a and 40b. These color light components are transmitted through the projection original images 34a, 34b, and 34c of the liquid crystal light valves having image information corresponding to the respective colors, and the three R, G, and B color images are mixed by the dichroic mirrors 41a and 41b again. The mixed image is projected onto a screen (not shown) by the projection lens 36. On the other hand, of heat rays of light having a wavelength of 700 nm or more, infrared light and heat rays having a wavelength of 800 nm or more are cut by the filter 33, and near infrared light in the wavelength range between 700 nm and 800 nm is transmitted through the filter 33 and the dichroic mirrors 40a and 40b. The near infrared light is reflected by a portion other than the coating portion 44a of the beam splitter 44, and the reflected light is projected onto the screen (not shown) by the projection lens 36. The light reflected by the screen is transmitted through the projection lens 36, is reflected by the dichroic mirror 41b, is transmitted through the coating portion 44a of the beam splitter 44, and is then guided to the focus detector 38 by the convergent lens 45, thereby performing focus detection.

In the three-plate type projector with the above-mentioned arrangement, a method of performing focus detection at the optical axis position of the projection lens without decreasing the brightness of an image to be projected in an auto-focus device using the projection light source 31 as a projection light source can be applied to a projection type display apparatus.

This embodiment can simplify the apparatus structure since a mirror for guiding light emerging from the projection original image 34a in the direction of the dichroic mirror 41a also serves as a beam splitter for guiding reflection light from the projection surface to the focus detector 38.

Figure 15:
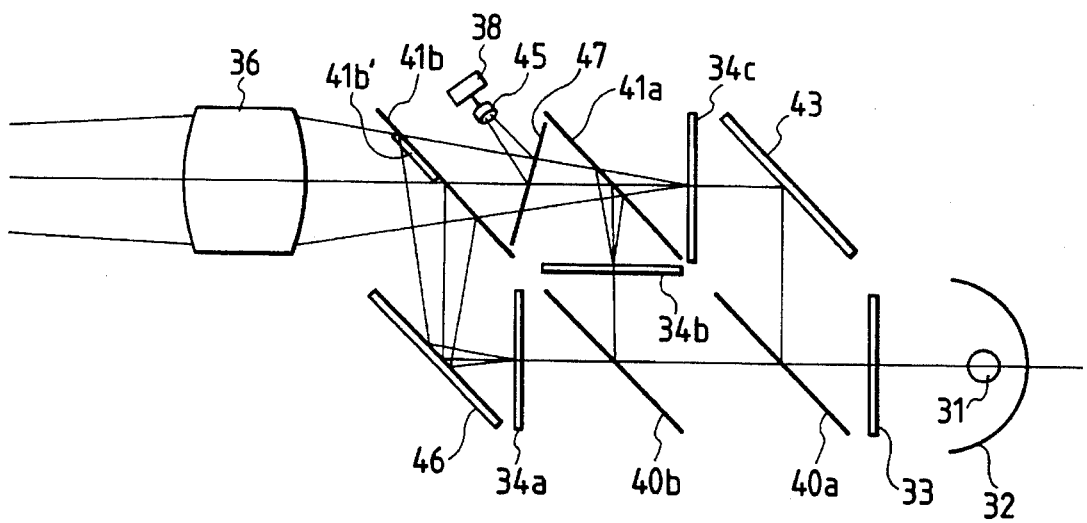
FIG. 15 is an optical sectional view showing another embodiment of the present invention.

FIG. 15 shows still another embodiment wherein the present invention is applied to a three-plate type liquid crystal projector.

Figure 16:
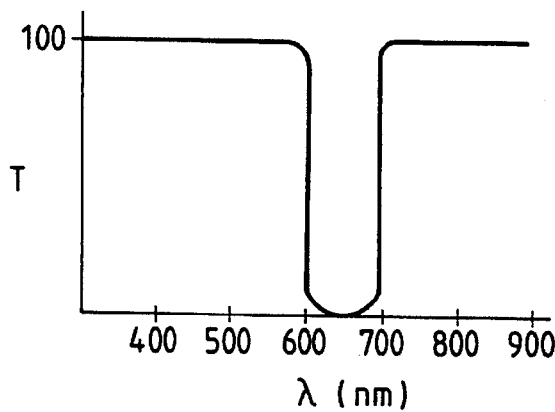
FIG. 16 is a graph showing transmission spectral characteristics.
Figure 17:
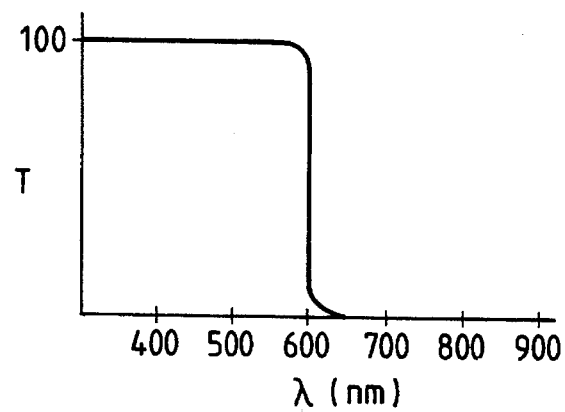
FIG. 17 is a graph showing transmission spectral characteristics.

In this embodiment, as an optical member, adjacent to a projection original image 34a, for reflecting light emerging from the projection original image 34a, a total reflection mirror 46 is used, and a portion of a dichroic mirror 41b for mixing R, G, and B light components serves as a beam splitter with a coating 41b' having spectral characteristics, as shown in FIG. 16. A beam splitter 47 having spectral characteristics, as shown in FIG. 17, is arranged behind the dichroic mirror 41b. Some light components of light reflected by a screen are transmitted through a projection lens 36, are transmitted through the coating 41b' having the spectral characteristics shown in FIG. 16 of the dichroic mirror, and are reflected by the beam splitter 47. The reflected light components are guided to a focus detector 38, thereby performing focus detection.

In this embodiment, the spectral characteristics of mirrors and filters other than the dichroic mirror 41b, the total reflection mirror 46, and the beam splitter 47 can be the same as those in the embodiment shown in FIG. 7.

In addition,

1. It is interpreted that an apparatus, which can insert/remove a projection original image in/from the apparatus like in a slide projector, has the arrangement of the present invention when a projection original image is inserted in an insertion portion.

2. When the beam splitter for guiding reflection light to the focus detector comprises means formed of a resin film such as a pellicle mirror, an astigmatism can be prevented, and good projection image can be obtained.

3. Light to be guided to the focus detector may fall within a wavelength range between 700 nm and 750 nm or between 750 nm and 850 nm. Thus, a wavelength range, which is used in neither focus detection nor image projection, may be present between the focus detection wavelength range and the image projection wavelength range.

4. When infrared light used in focus detection has a wavelength range as wide as possible, it is advantageous since the light amount is increased. However, in this case, a projection original image such as a liquid crystal may be thermally damaged. Therefore, a filter near the projection light source is constituted by two types of filters, so that the first filter has spectral characteristics for transmitting light in a wide wavelength range between 400 nm and 1,000 nm, and cutting light having a wavelength exceeding the transmission wavelength range, and the second filter has spectral characteristics for transmitting light in a wavelength range between 400 nm and 800 nm, and cutting light having a wavelength exceeding the transmission wavelength range. When no focus detection is performed, at least the second filter is set in the optical path, and when focus detection is performed, only the first filter is left in the optical path, thereby eliminating the above-mentioned drawback.

5. A mirror for guiding reflection light to a focus detection device may comprise a small mirror for transmitting visible light and selectively reflecting infrared light.

6. A mirror for guiding reflection light to a focus detection device may comprise a half mirror in a visible light region when the projected image can become slightly dark.

In the embodiment described above, since focus adjustment is performed for a position near the center of a projected image, the clearest image can be obtained even when the screen surface is inclined.

Once the apparatus is set, even when the refractive index of the projection lens changes due to heat from the light source, and the focal point position is moved, or even when the lens suffers from misalignment, a defocusing state between the auto-focus device and the projection lens can be prevented.

Furthermore, since focus detection is performed utilizing the projection light source for projecting an image to be projected, an extra projection light source for focus detection need not be arranged, and the number of components can be decreased.

Figure 18:
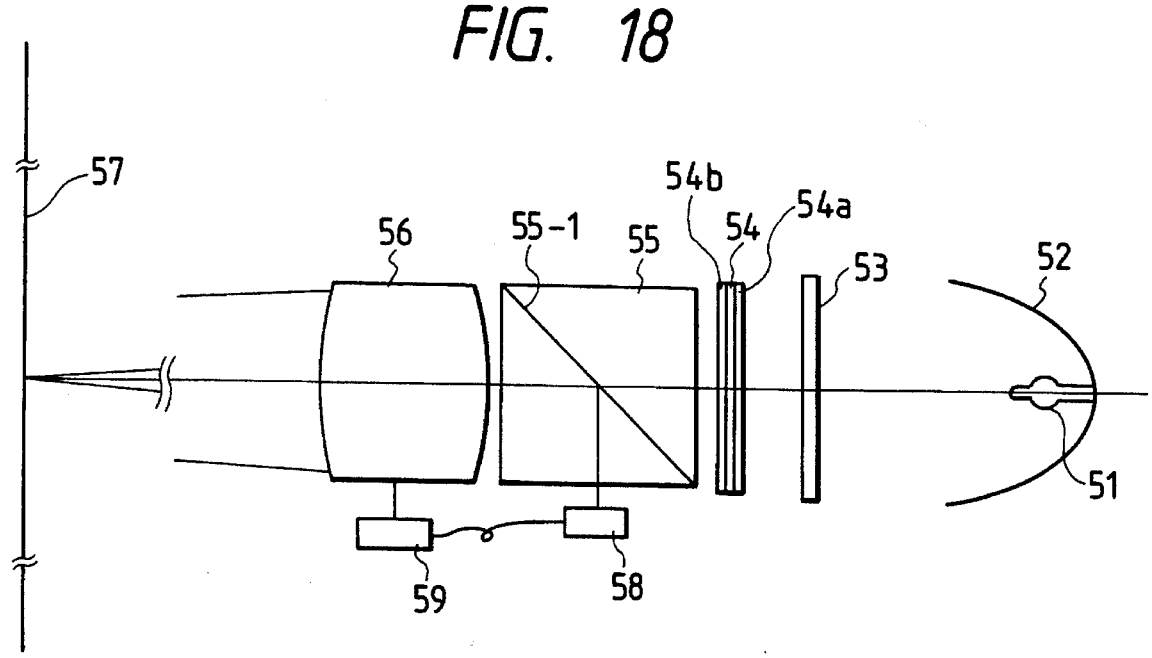
FIG. 18 is an optical sectional view showing another embodiment of the present invention.

FIG. 18 shows still another embodiment of the present invention. A projector of this embodiment comprises a projection light source 51 such as a halogen lamp or a metal halide lamp, a reflector 52, a heat cut filter 53 for cutting heat rays to prevent a projection original image from being thermally damaged, a projection original image 54 of a liquid crystal light valve, polarization plates 54a and 54b, which are arranged at the two sides of the liquid crystal light valve 54, so that their polarization axes are perpendicular to each other, a polarization beam splitter 55 having a polarization splitting film 55-1, a projection lens 56 for projecting the projection original image 54 onto a screen 57, a focus detector 58, and a lens driving device 59. Light emitted from the projection light source 51 is incident on the heat cut filter 53, and heat rays are cut from the light. The light emerging from the filter 53 illuminates the projection original image 54. The light (P-polarized light) transmitted through the projection original image 54, and transmitted through the polarization plates 54a and 54b having the polarization axes in a direction parallel to the drawing surface is incident on the polarization beam splitter 55, and is transmitted through the polarization beam splitter 55 without any influence. The light transmitted through the splitter 55 is projected onto the screen 57 by the projection lens 56. Polarization of light diffused and reflected by the screen 57 is slightly disordered, and the reflected light includes an S-polarized light component. For this reason, when the light is transmitted through the projection lens 56, and is incident on the polarization beam splitter 55 again, the S-polarized light component is reflected by the polarization beam splitter 55, and is guided to the focus detector 58, thereby performing focus detection. Furthermore, the projection lens 56 is driven by the lens driving device 59 according to the output signal from the focus detector 58 so as to perform focus adjustment.

Note that the focus detector 58 may comprise a conventional focus detector for detecting a defocused state of an image, or may comprise a conventional focus detector for detecting a shift between two images using a pupil-split optical system to detect a focal point.

Conventionally, when a TTL-AF mechanism is adopted in a projection type display apparatus, since a beam splitter for guiding light toward a focus detector is arranged in the optical path of light to be projected, a problem of a dark projected image is posed. However, according to the optical system of this embodiment, the TTL-AF mechanism can be adopted in a projection type display apparatus without decreasing the brightness of a projected image in an auto-focus device using the projection light source 51 as a projection light source. When the projection type display apparatus adopts the TTL-AF mechanism, a light-receiving portion of the focus detector 58 need only be set at a position conjugate with the projection original image 54 with respect to the projection lens 56. Once the apparatus is set, even when the refractive index of the projection lens changes due to heat from the light source, and the focal point position is moved, or even when the lens suffers from misalignment, a defocusing state between the auto-focus device and the projection lens can be prevented.

In this embodiment, even when ghost light caused by internal reflection in the projection lens upon projection is incident on the polarization beam splitter 55 again, the ghost light is transmitted through the polarization beam splitter 55 since it is P-polarized light, and is not incident on the light-receiving portion of the focus detector. For this reason, the S/N ratio of detection light is satisfactory, and focus detection precision is high. Furthermore, the ghost light caused by internal reflection, which is transmitted through the polarization beam splitter 55 in a direction of a liquid crystal panel, is reflected by the surface of the liquid crystal panel, and is incident on the polarization beam splitter 55 again. However, since this incident light is P-polarized light, it is transmitted through the polarization beam splitter 55 and the projection lens, and is not incident on the light-receiving portion of the focus detector.

Furthermore, in this embodiment, since focus detection is performed utilizing the projection light source for projecting an image to be projected, an extra projection light source for focus detection need not be arranged, and the number of components can be decreased.

Figure 19:
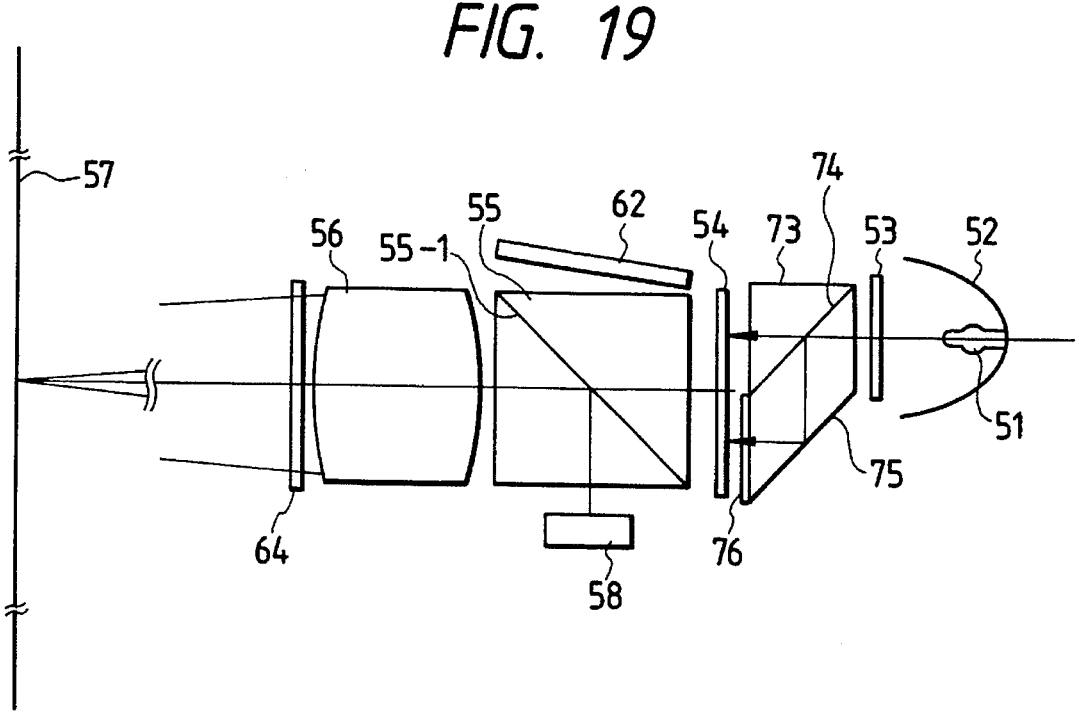
FIG. 19 is an optical sectional view showing another embodiment of the present invention.

FIG. 19 shows still another embodiment of the present invention. In this embodiment, a polarization conversion element 73, which is formed by joining a triangular prism and a parallelogram prism, has a polarization splitting film 74 at the joint surface, and also has a halfwave plate 76 at the exit portion of the parallelogram prism, is added between the heat cut filter 53 and the projection original image 54 as a liquid crystal plate in the above-mentioned embodiment, and the polarization plates 54a and 54b arranged at two sides of the liquid crystal light valve 54 in FIG. 18 are omitted.

Light emitted from a projection light source 51 is natural light having polarization directions in every direction. Heat rays are cut from the light emitted from the light source 51 by the heat cut filter 53, and light emerging from the filter 53 is incident on the polarization conversion element 73. A P-polarized light component of the light is transmitted through the polarization splitting film 74 at the joint surface, and emerges from the polarization conversion element 73. On the other hand, an S-polarized light component is reflected by the polarization splitting film 74, and is directed by a total reflection surface 75 of the parallelogram prism in the same direction as the propagation direction of the P-polarized light component. The polarization direction of the S-polarized light component is rotated by the halfwave plate 76 through 90°, and the rotated S-polarized light component emerges from the polarization conversion element 73 as P-polarized light. In this manner, the polarization conversion element 73 polarizes incident natural light to P-polarized light, and emerges the P-polarized light.

Therefore, no polarization plate is required at the incident side of the liquid crystal light valve 54, while a polarization plate at the exit side thereof can also be omitted since it can be substituted with a polarization beam splitter 55. Light transmitted through the projection original image 54 and modulated by the liquid crystal light valve is incident on the polarization beam splitter 55, is analyzed by the polarization beam splitter 55, and is projected onto a screen 57 as a projected image by a projection lens 56. A quarterwave plate 64 is arranged at the screen side of the projection lens 56 to convert light to be projected into circularly polarized light. In this manner, at least 50% of an S-polarized light component, which is diffused and reflected by the screen 57, is transmitted through the projection lens 56, and is reflected by the polarization beam splitter 55 to be guided to a focus detector 58 can be assured regardless of the type of screen.

In this embodiment, a ghost light absorbing plate 62 formed by applying an absorbing paint on the back surface of a black parallel flat plate is obliquely arranged above the polarization beam splitter 55. The ghost light absorbing plate 62 absorbs an S-polarized light component, i.e., light including a polarized light component other than the P-polarized light modulated by the liquid crystal light valve, which is detected and reflected by the polarization beam splitter 55, thereby further improving focus detection precision.

Figure 20:
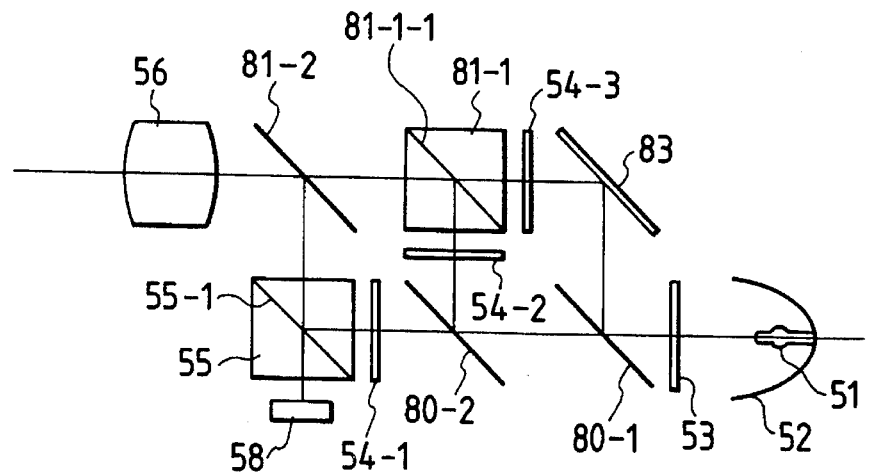
FIG. 20 is an optical sectional view showing another embodiment of the present invention.

FIG. 20 shows still another embodiment wherein the present invention is applied to a three-plate liquid crystal projector.

The projector of this embodiment comprises a projection light source 51 such as a metal halide lamp, a reflector 52, a heat cut filter 53, a dichroic mirror 80-1 for transmitting red light and green light, and reflecting blue light, a dichroic mirror 80-2 for transmitting green light and reflecting red light, projection original images 54-1, 54-2, and 54-3 comprising liquid crystal light valves, a total reflection mirror 83, a polarization beam splitter 55 having, on a joint surface, a polarization splitting film 55-1 for transmitting P-polarized light, and reflecting S-polarized light, a projection lens 56, a dichroic prism 81-1 having, on a joint surface of a prism block, a dichroic film 81-1-1 for transmitting blue light, and reflecting red light, so that the light fluxes from the projection original images 54-1, 54-2, and 54-3 projected by the projection lens 56 cause the same spherical aberration, a dichroic mirror 81-2 for transmitting blue light and red light, and reflecting green light, and a focus detector 58.

In this arrangement, light emerging from a polarization plate at the side of the projection lens of the liquid crystal light valve 54-1 and light reflected by the beam splitter 55 are P-polarized light.

Light emitted from the projection light source is separated into three R, G, and B light components by the dichroic mirrors 80-1 and 80-2, and these light components are transmitted through the projection original images 54-1, 54-2, and 54-3 having image information corresponding to the respective colors. The three R, G, and B color images are mixed by the dichroic prism 81-1 and the dichroic mirror 81-2, and the mixed image is projected onto a screen (not shown) by the projection lens 56.

Light diffused and reflected by the screen includes both S- and P-polarized light components. The light is transmitted through the projection lens 56, and is reflected by the dichroic mirror 81-2. In this case, the P-polarized light component of the light is transmitted through the polarization beam splitter 55, and is guided toward the focus detector 58, thereby performing focus detection.

In the three-plate type liquid crystal projector, since the projection original images 54-1, 54-2, and 54-3 comprise liquid crystal light valves, and light emerging therefrom is polarized light, a TTL-AF mechanism can be adopted in a projection type display apparatus without decreasing the brightness of a projected image according to the above-mentioned auto-focus device using the projection light source 1 as a projection light source.

In this embodiment, since a mirror for directing light emerging from the projection original image 54-1 in a direction of the dichroic mirror 81-2 also serves as a beam splitter for guiding light reflected by the screen to the focus detector 58, the apparatus structure can be simplified as compared to a conventional apparatus.

Furthermore, in this embodiment, the dichroic prism 81-1 is used as an optical element for mixing light components emerging from the projection original images 54-2 and 54-3. However, this optical element may comprise a dichroic mirror depending on the f-number of the projection lens 56, and in this case, an unbalance among three projected images can be ignored.

The present invention is not limited to the above embodiments, and also includes the following embodiments.

(a) It is interpreted that an apparatus, which can insert/remove a projection original image in/from the apparatus like in a slide projector, has the arrangement of the present invention when a projection original image is inserted in an insertion portion.

(b) An arrangement wherein a projection light source for focus detection and a chart are arranged outside the projection optical system is also available. In this arrangement, light diffused and reflected by the screen is transmitted through the projection lens 56, and is reflected by the dichroic mirror 81-2. A P-polarized light component of the reflected light is transmitted through the polarization beam splitter 55, and is guided by a focusing lens 85 toward the focus detector 58, thereby performing focus detection. At this time, when light projection for external focus detection is made using the same polarized light component as polarized light guided to the focus detector 58, a light loss and ghost light can be eliminated.

(c) The polarization beam splitter 55 is not limited to a prism shape, but may comprise means obtained by coating a polarization splitting film on a parallel flat plate.

With the above arrangement, since the projection original image can be projected without attenuating projection light, a combination of a projection type display apparatus and a TTL-AF mechanism can be put into a practical application without decreasing the brightness of a projected image. This also means that the light amount for focus detection is large, i.e., that focus detection precision can be improved.

Figure 21:
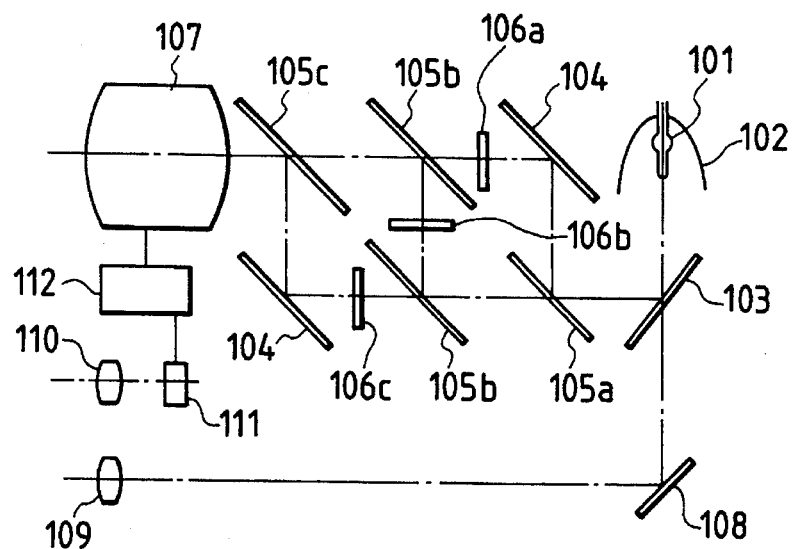
FIG. 21 is an optical sectional view showing another embodiment of the present invention.

FIG. 21 is an optical sectional view showing a projection type optical system according to still another embodiment of the present invention. The apparatus of this embodiment comprises a light source 101 such as a metal halide lamp, a reflection hat 102 for reflecting light emitted from the light source 101, and outputting almost collimated light, a cold mirror 103 for reflecting visible light of the light emitted from the light source, a total reflection mirror 104, a dichroic mirror 105a for reflecting red light having a wavelength of about 600 nm or more, a dichroic mirror 105b for reflecting green light in a wavelength range between 500 nm and 600 nm, a dichroic mirror 105c for reflecting blue light having a wavelength of about 500 nm or less, image display elements 106a, 106b, and 106c, comprising, e.g., liquid crystal elements, for respectively displaying red, green, and blue components of a display original image, a projection lens system 107, a total reflection mirror 108, a projection lens 109, a light-receiving lens 110, a beam spot position detection element 111, and a lens driving device 112 for driving all or some components of the projection lens system 107.

Light emitted from the light source 101 emerges from the reflection hat 102 as almost collimated light, and its visible light components are guided toward a color separation optical system by the cold mirror 103. More specifically, red light of the visible light components is reflected by the dichroic mirror 105a, is guided toward the image display element 106a by the total reflection mirror 104, and is subjected to spatial modulation. Thereafter, the modulated light is transmitted through the dichroic mirrors 105b and 105c, and an image on the image display element 106a is then projected in an enlarged scale onto a screen (not shown) by the projection lens system 107. Of the visible light components, green light is transmitted through the dichroic mirror 105a, and is reflected by the dichroic mirror 105b. Thereafter, the green light is guided to the image display element 106b, and is subjected to spatial modulation. The modulated light is reflected by the dichroic mirror 105b, and is transmitted through the dichroic mirror 105c. As a result, an image on the image display element 106b is projected in an enlarged scale onto the screen by the projection lens system 107. Of the visible light components, blue light is transmitted through the dichroic mirrors 105a and 105b, and is guided to the image display element 106c so as to be subjected to spatial modulation. The modulated light is reflected by the total reflection mirror 104 and the dichroic mirror 105c, and thereafter, an image on the image display element 106c is projected in an enlarged scale onto the screen by the projection lens system 107. More specifically, on the screen (not shown), the images on the image display elements 106a, 106b, and 106c are mixed, and a color image is projected in an enlarged scale.

Of light source light transmitted through the cold mirror 103, an infrared light component is guided to the projection lens 109 by the total reflection mirror 108, and is projected as a focus detection light beam onto the screen by the projection lens 109. The focus detection light beam projected onto the screen is reflected by the screen, is incident on the light-receiving lens 110, and forms a beam spot on the beam spot position detection element 111. The lens driving device 112 drives a focusing lens as all or some lenses of the projection lens system 107 to a predetermined position on the basis of position information output from the beam spot position detection element 111, thus performing focus adjustment.

More specifically, in this embodiment, as a means for guiding light to a focus detection means, the cold mirror 103 for protecting the image display elements from heat is utilized to split light source light, some components of the light source light are projected onto the screen by the total reflection mirror 108 and the projection lens 109, and focus detection is performed by the light-receiving lens 101 and the beam spot position detection element 111.

Figure 22:
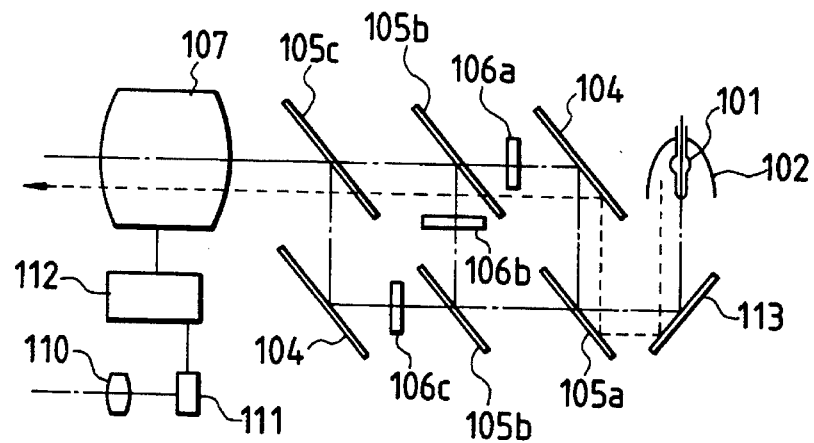

Still another embodiment of the present invention will be described below. FIG. 22 is an optical sectional view of a projection type display apparatus according to still another embodiment of the present invention. In this embodiment, a compound mirror 113 which comprises the cold mirror 103 in the above embodiment, a portion of which comprises a mirror for reflecting only infrared light, is used in place of the cold mirror 103. The hatched portion of the mirror 113 corresponds to an infrared light reflection portion. Light reflected by this portion is transmitted through a color separation system, a color mixing system, and a portion of a projection lens system 107 of the apparatus, and as a result, some components of light source light are projected onto a screen (not shown) along an optical path indicated by a broken line in FIG. 22.

Figure 23:
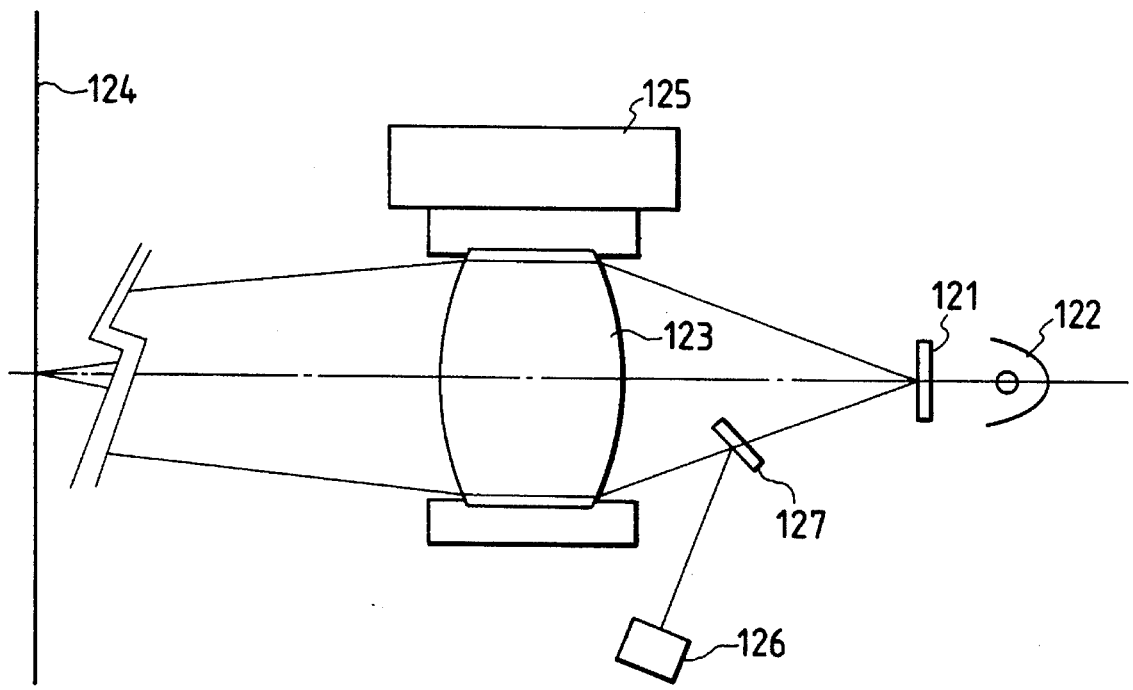
FIG. 23 is an optical sectional view showing another embodiment of the present invention.

FIG. 23 shows a projection optical apparatus having an auto-focus system according to still another embodiment of the present invention. The apparatus shown in FIG. 23 comprises a liquid crystal panel 121 for converting an electrical image information signal output from an electronic apparatus (not shown) into a visible image, an illumination unit 122 for illuminating the liquid crystal panel 121 from the back side, a projection optical system 123 for projecting an image reproduced on the liquid crystal panel 121 onto a screen 124 in an enlarged scale, and a driving unit 125 for driving the projection optical system in the optical axis direction.

After the screen 124 is set at an arbitrary position in front of the focusing lens 123, an image to be projected is reproduced on the liquid crystal panel 121, and the liquid crystal panel 121 is illuminated by the illumination unit 122 from the back side, thereby reproducing an image formed by the focusing lens 123 and projected onto the screen 124. At this time, an image projected onto the screen 124 is often in an out-of-focus state, and focus adjustment is required.

The apparatus shown in FIG. 23 also includes a focusing state detection device 126, and a reflection mirror 127 for guiding light reflected by the screen and transmitted through the projection optical system 123 toward the focusing state detection device 126.

Figure 24:
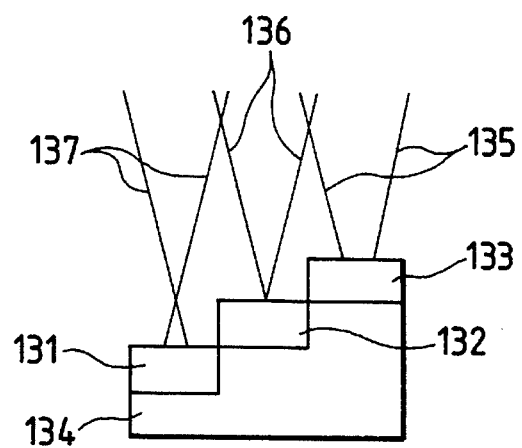
FIG. 24 is a partial enlarged view.

FIG. 24 is a schematic view of the focusing state detection device 126. Line sensors 131 to 133 are arranged on a stepped table 134. The line sensor 132 is arranged at a position almost equivalent to the liquid crystal panel 121 with respect to the reflection surface of the reflection mirror 127. The line sensor 131 is located at a position slightly farther from the reflection mirror 127 than the position of the line sensor 132. Contrary to this, the line sensor 133 is arranged at a position slightly nearer the reflection mirror 127 than the position of the line sensor 132.

An image reproduced on the liquid crystal panel 121 is projected onto the screen 124 by the illumination unit 122 for illuminating the liquid crystal panel 121 from the back side, and the projection optical system 123, thus reproducing a projected image. Some light components of light from the image reproduced on the screen 124 return to the liquid crystal panel 121 through the projection optical system 123 again. Some light components of the returned light are incident on the focusing state detection device 126 by the reflection mirror 127 arranged between the projection optical system 123 and the liquid crystal panel 121. The light incident on the focusing state detection device 126 is focused on the line sensors 131 to 133. In this case, since the line sensors are slightly shifted from the optical axis direction, electrical signals output from the line sensors are different from each other. Then, an in-focus position or focusing direction of an image projected onto the screen 124 is judged based on a judgment condition that as an electrical signal includes a larger number of high-frequency components, it is approximate to an in-focus state. On the basis of this information, a microcomputer (not shown) controls the driving unit 125 to move the projection optical system 123 along the optical axis, so that the line sensor 132 arranged at the position almost equivalent to the liquid crystal panel 121 is located at the in-focus position, thereby adjusting the focusing state.

Since the common focusing lens is used, when the line sensor 132 is set in an in-focus state, the liquid crystal panel 121 arranged at the position almost equivalent to the line sensor 132 can be set in an in-focus state with respect to the screen 124.

Figure 25:
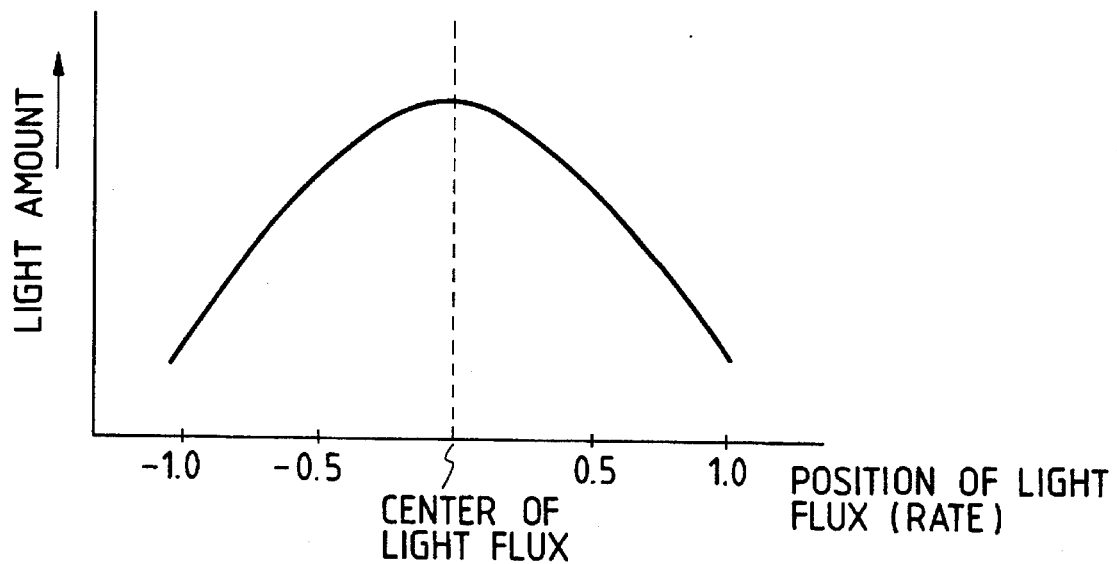
FIG. 25 is a graph showing a light intensity distribution.

FIG. 25 expresses the light amount distribution from the light source 122 for illuminating the liquid crystal panel 121 from the back side as the height of a light flux. In general, such a projection system need not always have uniform light amounts at the respective portions of a light flux, and as shown in FIG. 25, the light amount near the center of the light flux is higher than peripheral portions. Therefore, the eclipse of a light flux from the liquid crystal panel 121 by the reflection mirror 127 shown in FIG. 23 has no serious influence as compared to an actual area ratio.

Figure 26:
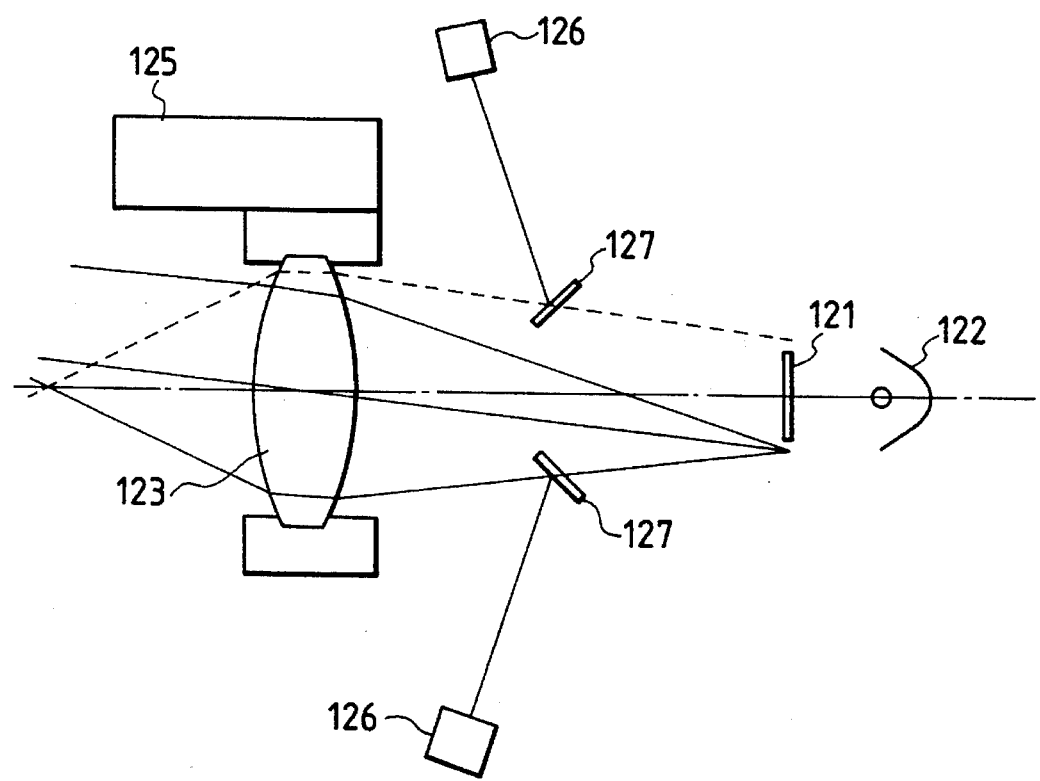
FIG. 26 is an optical sectional view showing another embodiment of the present invention.
Figure 49:
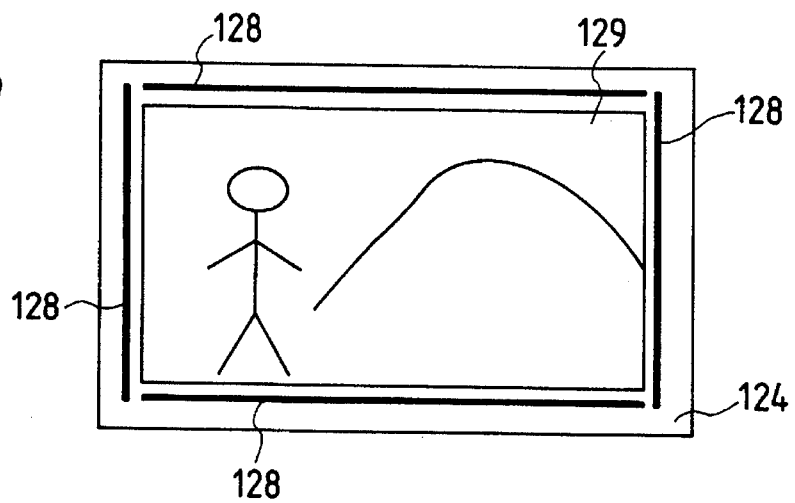
FIG. 49 is a view showing a screen.
Figure 50:
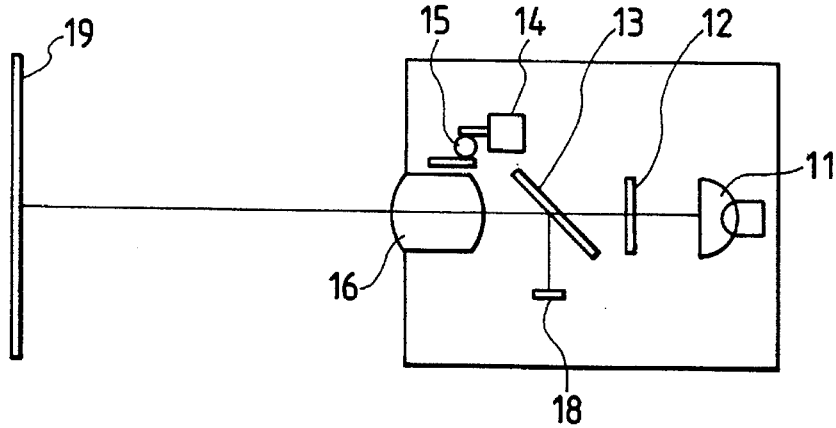
FIG. 50 is an optical sectional view.

FIG. 26 shows still another embodiment of the present invention. In this embodiment, four sets of focus detection devices 126 and reflection mirrors 127 (two sets are not shown) are horizontally and vertically arranged at 90°-intervals with respect to the center of light flux, and a black frame 128 is formed around a projection surface 129 of a screen 124, as shown in FIG. 49. Each of the four focus detection devices 126 comprises a plurality of line sensors, as shown in FIG. 24, and one of the plurality of line sensors is arranged at a position equivalent to a liquid crystal panel 121 with respect to the corresponding reflection mirror 127. The positions of all the line sensors, and numbers of line sensors arranged at the positions equivalent to the liquid crystal panel 121 are stored in a memory of a microcomputer (not shown).

After the screen 124 is set at an arbitrary position in front of a focusing lens 123, an image to be projected is reproduced on the liquid crystal panel 121, and the liquid crystal panel 121 is illuminated by an illumination unit 122 from the back side, thereby reproducing an image formed by the focusing lens 123 and projected onto the screen 124.

On each focus detection device 126, an image of the frame 128 is formed through the corresponding reflection mirror 127 and the projection optical system 123. A light flux incident on the focus detection device 126 is focused on line sensors 131 to 133. In this case, since the line sensors are slightly shifted from the optical axis direction, electrical signals output from the line sensors are different from each other. Then, an in-focus position or focusing direction of the image of the frame 128 on the frame 124 is judged based on a judgment condition that as an electrical signal includes a larger number of high-frequency components, it is approximate to an in-focus state. On the basis of this information, the microcomputer (not shown) controls a driving unit 125 to move the projection optical system 123 along the optical axis, so that the line sensors arranged at the positions almost equivalent to the liquid crystal panel 121 of the stored focus detection devices are located at the in-focus position, thereby adjusting the focusing state.

When the line sensors at the positions almost equivalent to the liquid crystal panel are set in an in-focus state, the liquid crystal panel 121 can also be set in an in-focus state with respect to the screen 124. At this time, when the focusing data of the four sets of focus detection devices are analyzed, a parallel degree between the liquid crystal panel 121 and the screen 124, and errors of the focus detection devices can be detected, thus obtaining a more precise in-focus state.

As described above, a so-called liquid crystal projector for projecting an image reproduced on a liquid crystal surface onto a projection surface such as a screen by a focusing lens adopts a so-called TTL system in which a light flux for guiding image information on the projection surface to a focusing state detector so as to judge a focusing state on the projection surface, and a light flux for projecting an image reproduced on the liquid crystal surface onto the projection surface are transmitted through a single optical system. Peripheral components of the light flux for projecting an image reproduced on the liquid crystal surface onto the projection surface are used for setting the light flux for guiding image information on the projection surface to the focusing state detector. For this reason, an auto-focus device can be constituted without significantly decreasing the light amount for projecting an image reproduced on the liquid crystal surface onto the projection surface.

When an optical member such as a plastic lens, which suffers from a considerable change in refractive index or change in shape due to a temperature change, is used in a focusing optical system, in a liquid crystal projector having a large change in temperature, the focal length changes depending on the change in temperature in use, and the focusing state is undesirably changed. However, in the projection optical apparatus having the auto-focus system of the present invention, the liquid crystal panel and the line sensor 132 use the same focusing optical system, and are arranged at almost equivalent positions. Therefore, even when the focal length of the projection lens changes, the liquid crystal panel can maintain an in-focus state with respect to the screen as long as the position of the line sensor is maintained in an in-focus state with respect to the liquid crystal panel by the microcomputer.

Figure 27:
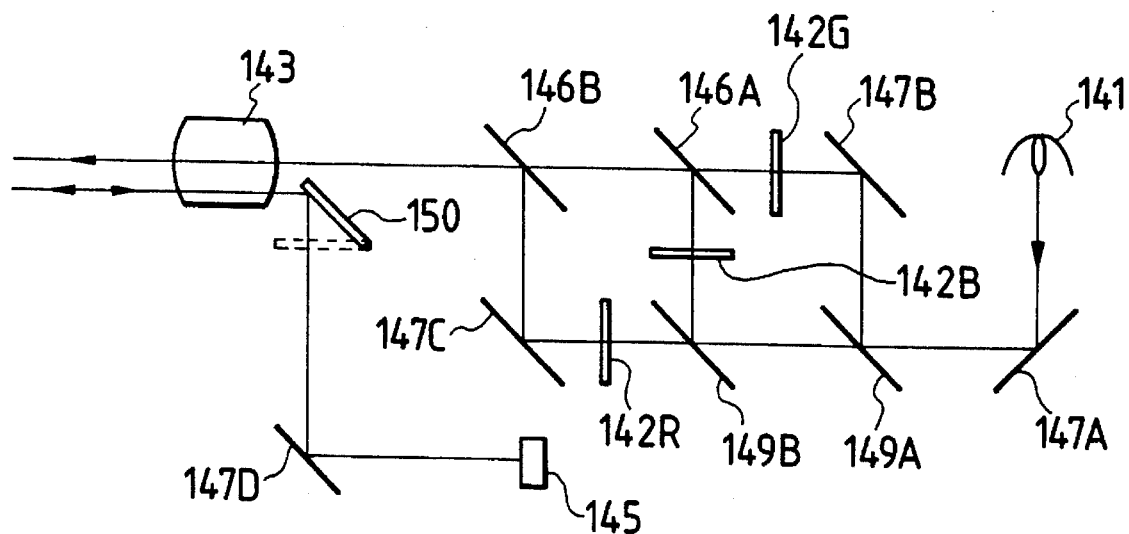
FIG. 27 is an optical sectional view showing another embodiment of the present invention.

FIG. 27 is a schematic sectional view showing still another embodiment of the present invention. The apparatus shown in FIG. 27 comprises a light source 141, liquid crystal panels 142R, 142G, and 142B, a projection lens 143, a light projection/receiving unit 145, half mirrors 146A and 146B, total reflection mirrors 147A, 147B, 147C, and 147D, a dichroic mirror 149A for reflecting only green light, a dichroic mirror 149B for reflecting only blue light, and a quick-return half mirror 150.

Light emitted from the light source 141 is deflected at a right angle by the total reflection mirror 147A, and is split into red, green, and blue light components by the dichroic mirrors 149A and 149B. Thereafter, these light components are transmitted through the liquid crystal panels 142R, 142G, and 142B, and are mixed again by the half mirrors 146A and 146B. The mixed light is projected in an enlarged scale onto a screen by the projection lens 143.

Light emitted from the light projection/receiving unit 145 for focus detection is guided to the projection lens by the quick-return half mirror 150 arranged immediately before the projection lens 143, and is projected onto the screen together with a projected image. The projected light returns to the light projection/receiving unit 145 along the same optical path.

Note that the liquid crystal panels 142R, 142G, and 142B, and the light projection/receiving unit 145 are arranged at optically equivalent distances from the projection lens 143.

The quick-return half mirror 150 is controlled by an electrical control circuit (not shown). When the power switch of the light source is turned on, or when a zooming operation of the projection lens is performed, or when a predetermined period of time elapses from the previous focus detection, the half mirror 150 is instantaneously inserted in the optical path of a projected image so as to measure a distance.

The insertion time of the quick-return half mirror 150 in the optical path is shorter than the operation time of one frame, and a light amount loss of a projected image caused by the half mirror during this interval is very small. Therefore, an observer almost does not notice a decrease in light amount.

When the insertion time of a focus detection optical system is very short like in this embodiment, a quick-return total reflection mirror may be used in place of the quick-return half mirror 150.

Figure 28:
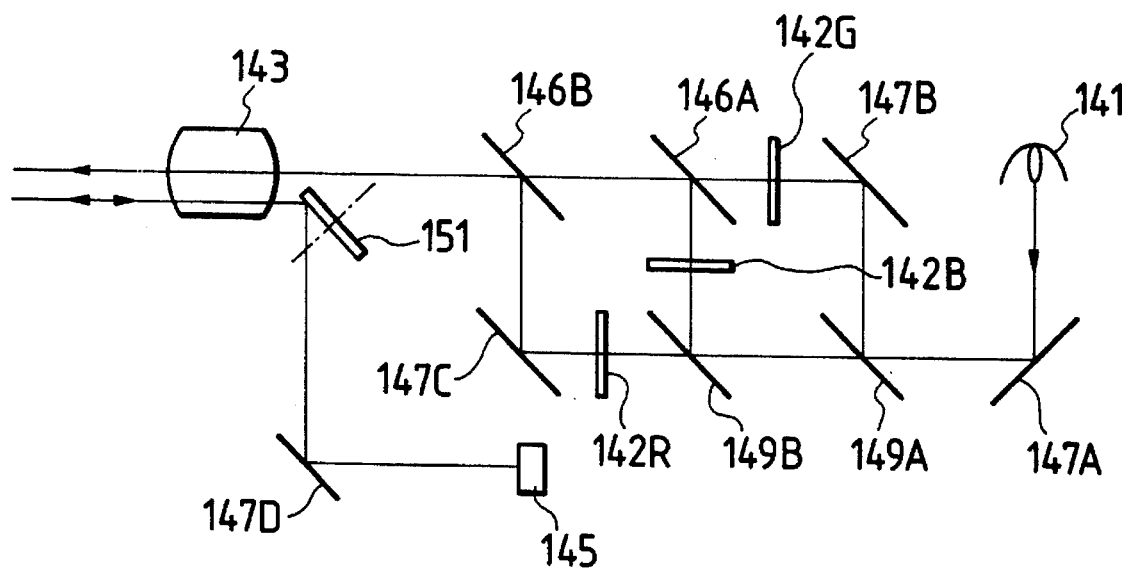
FIG. 28 is an optical sectional view showing another embodiment of the present invention.
Figure 29:
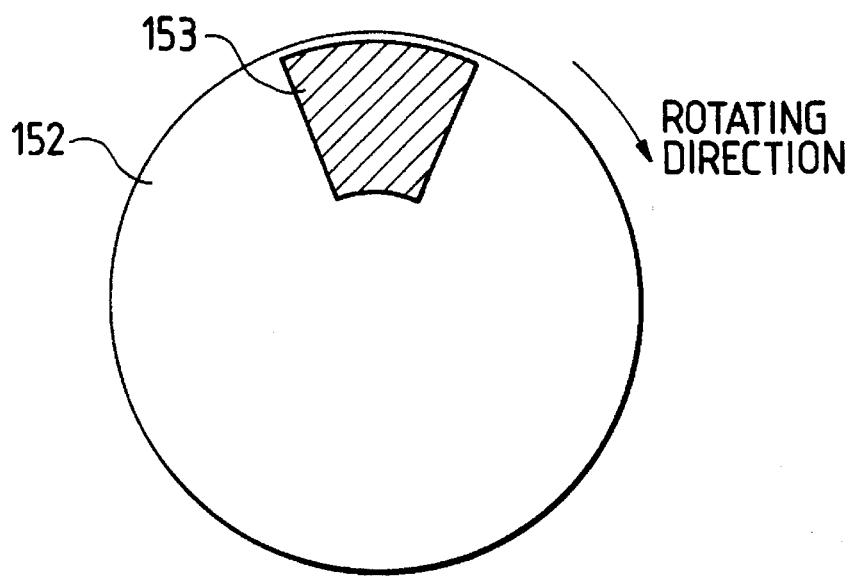
FIG. 29 is a view showing a constituting member.

FIGS. 28 and 29 are schematic views showing still another embodiment of the present invention. In FIGS. 28 and 29, a transparent resin disc 151 has a transparent portion 152, and a deposition film 153 having a high reflectance on the remaining portion of its surface.

The transparent resin disc 151 is arranged immediately before a projection lens 143, and is always rotated at high speed. Thus, the reflection portion and the transparent portion alternately and cyclically pass a position in front of the projection lens.

Since focus detection light is projected from a light projection/receiving unit 145, the focus detection light can be incident on the projection lens 143 at only an instance when the reflection portion of the transparent resin disc 151 passes the position in front of the projection lens 143. The focus detection light is reflected by the screen, and returns to the light projection/receiving unit 145 along the same optical path.

The transparent resin disc 151 is rotated at high speed, and the passing time of the reflection portion before the projection lens 143 is considerably longer than the time required until the projected focus detection light is reflected by the screen, and returns again, but is shorter than the time required for scanning one frame. Therefore, an observer almost does not notice a decrease in brightness of a projected image.

As described above, only when focus detection is performed, a focus detection optical means is inserted in an image projection optical system of a projection type display apparatus. Thus, a TTL-AF system can be realized without sacrificing the brightness of a projected image.

Figure 30:
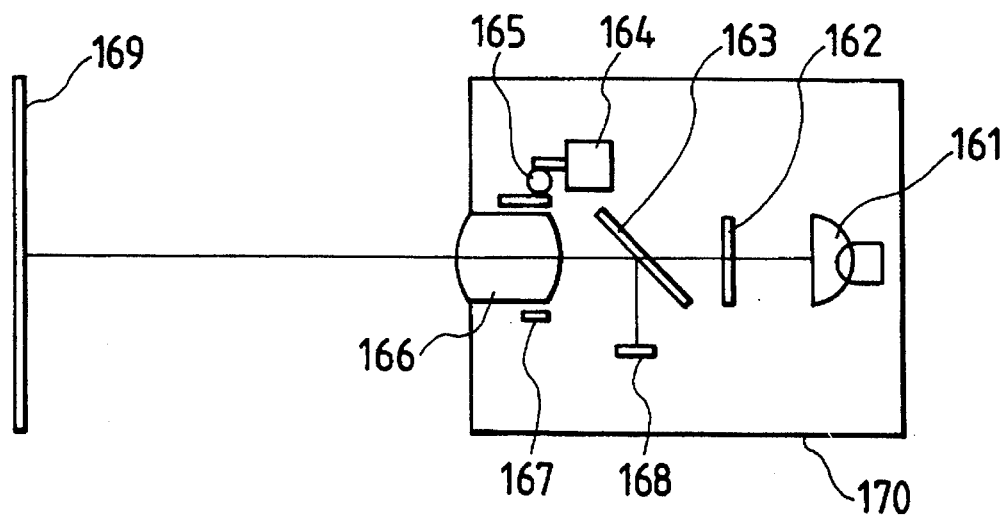
FIG. 30 is an optical sectional view showing another embodiment of the present invention.
Figure 31:
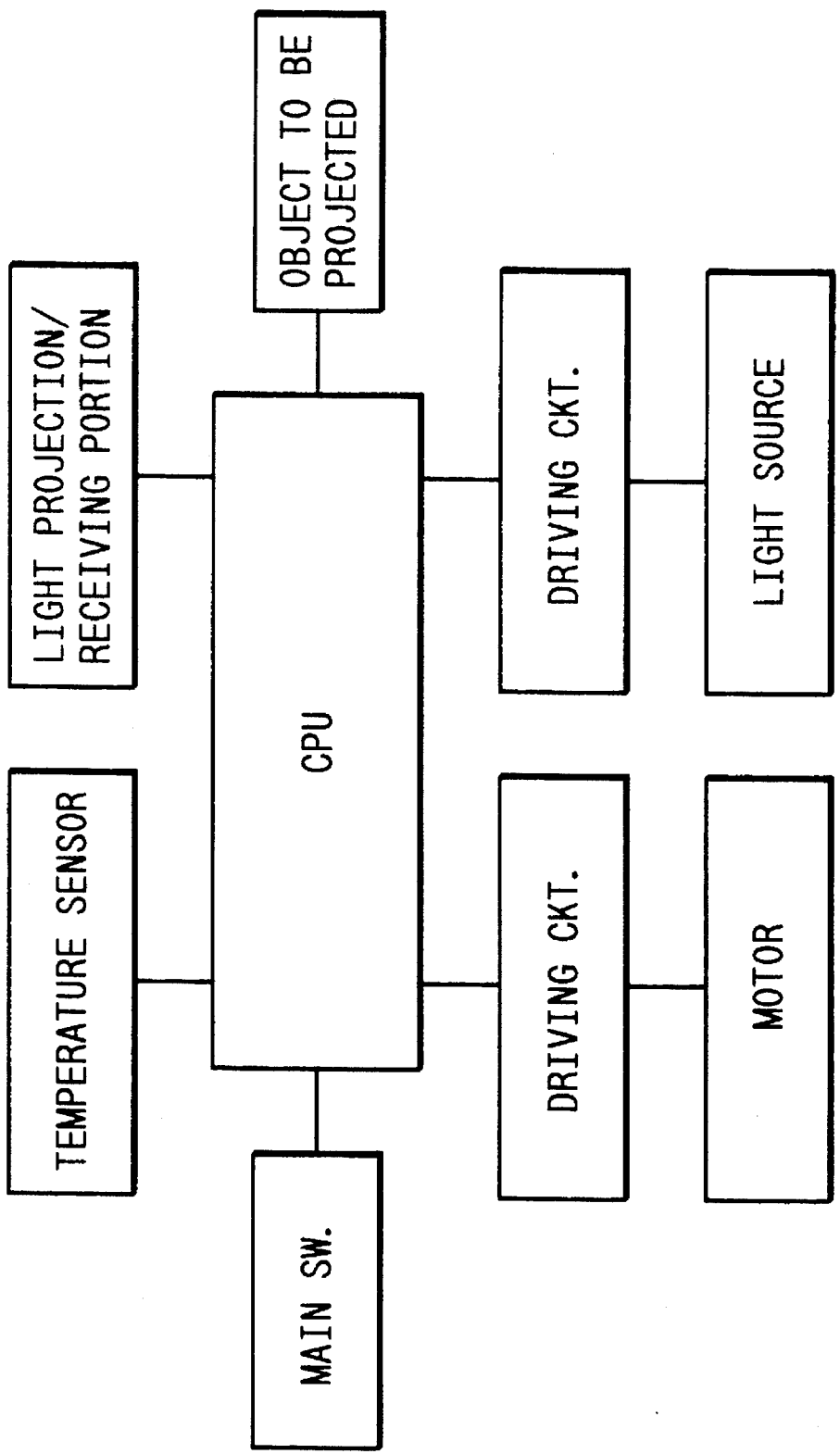
FIG. 31 is a block diagram.
Figure 32:
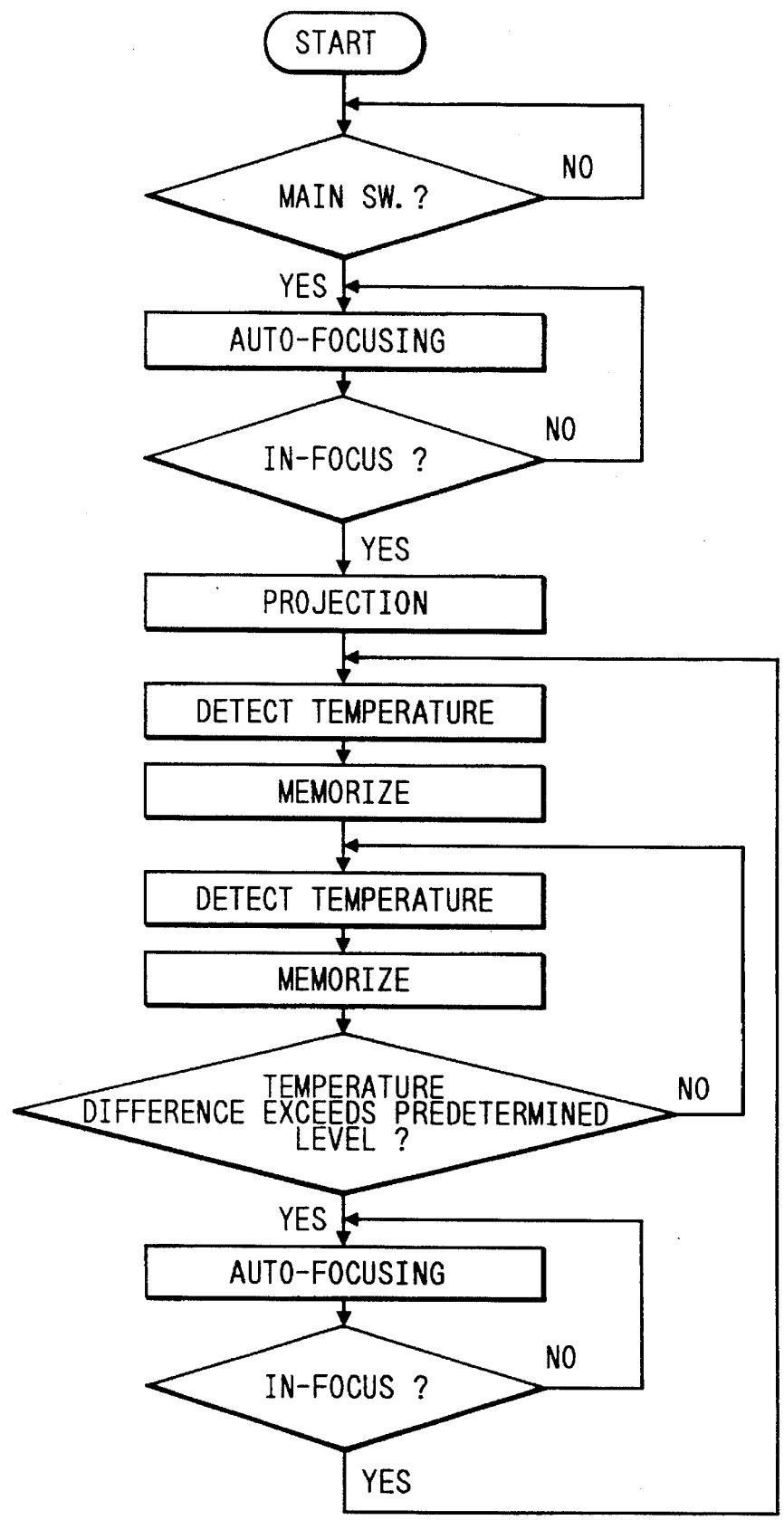
FIG. 32 is a flow chart.

FIG. 30 shows still another embodiment wherein the present invention is applied to a slide projector. In FIG. 30, the projector includes a screen 169, a light source 161, an object 162 to be projected onto the screen 169, a projection lens 166 for projecting the object 162 onto the screen 169, a driving system 165 for driving the projection lens 166 so as to adjust a focusing state, a motor 164 for driving the driving system 165, a temperature sensor 167 for detecting the temperature of the projection lens 166, a light projection/receiving portion 168 for performing an auto-focus operation, a half mirror 163 for reflecting light from the light projection/receiving portion 168, and a casing 170 of the slide projector. FIG. 31 is a block diagram showing the arrangement of a control system of this embodiment. FIG. 32 is a flow chart showing the operation of the control system of this embodiment.

When a switch is turned on, focus adjustment is performed by an auto-focus equipment, and the object 162 is projected onto the screen 169. The temperature of the projection lens 166 is detected by the temperature sensor 167, and is stored in a memory. Furthermore, the temperature of the projection lens 166 during projection is detected by the temperature sensor 167, and is stored in the memory. The stored temperature is compared with the temperature after the auto-focus operation is performed. When a change in temperature of the projection lens exceeds a predetermined value (e.g., 10° C. or more), focus adjustment is performed again by the auto-focus equipment. In order to perform the auto-focus operation, light projected from the light projection/receiving portion 168 is reflected by the half mirror 163, and is projected onto the screen 169 by the projection lens 166. The projected light is reflected by the screen 169, and is measured by the light projection/receiving portion 168 along the same optical path, thus correcting a focusing state.

With the above-mentioned operation, a defocusing state caused by a change in temperature of the projection lens 166 is automatically corrected. When a change in temperature is small, the defocusing amount is small and need not be corrected, a stable image can be obtained without performing an auto-focus operation.

Figure 33:
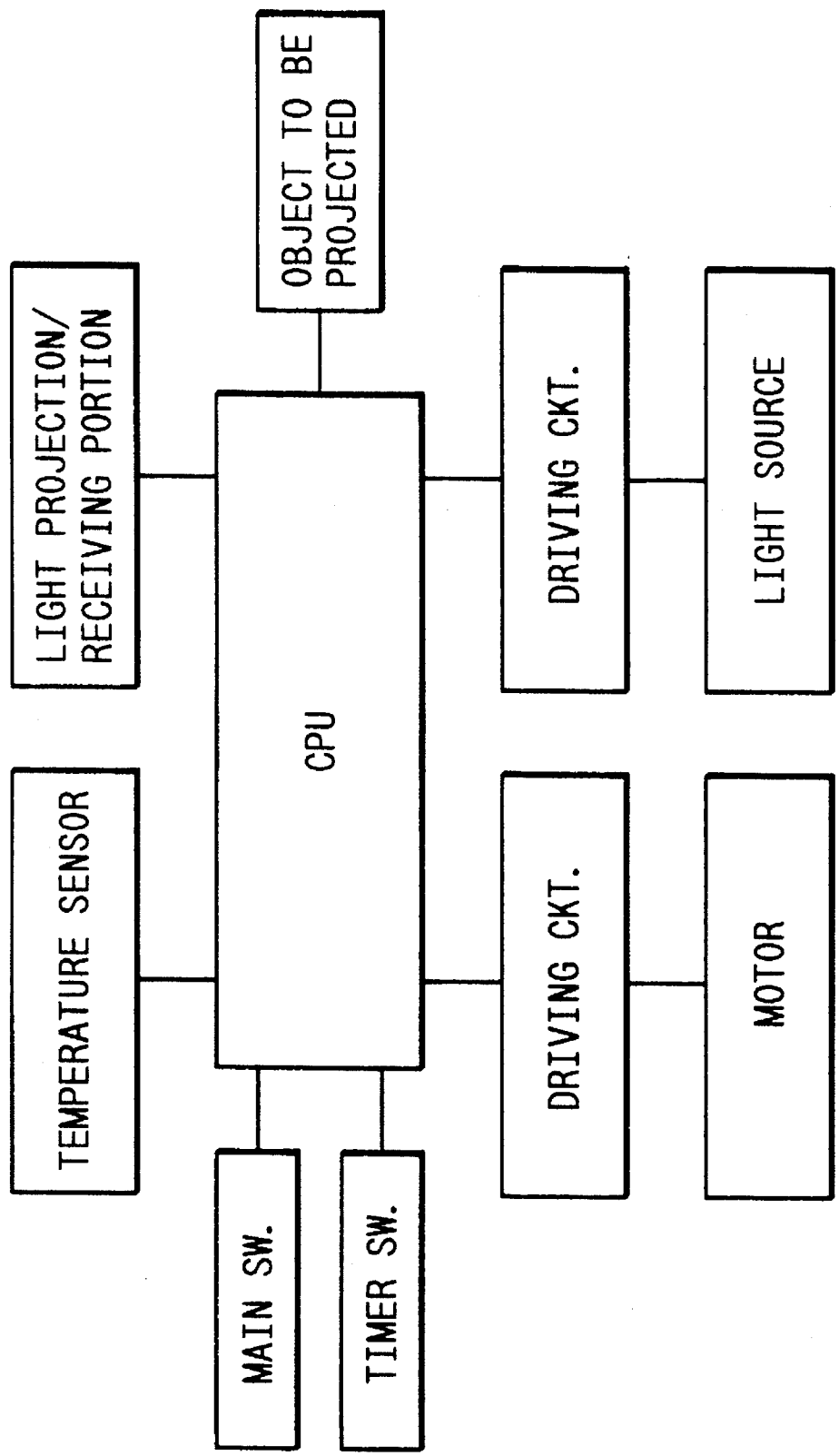
FIG. 33 is a block diagram.
Figure 34:
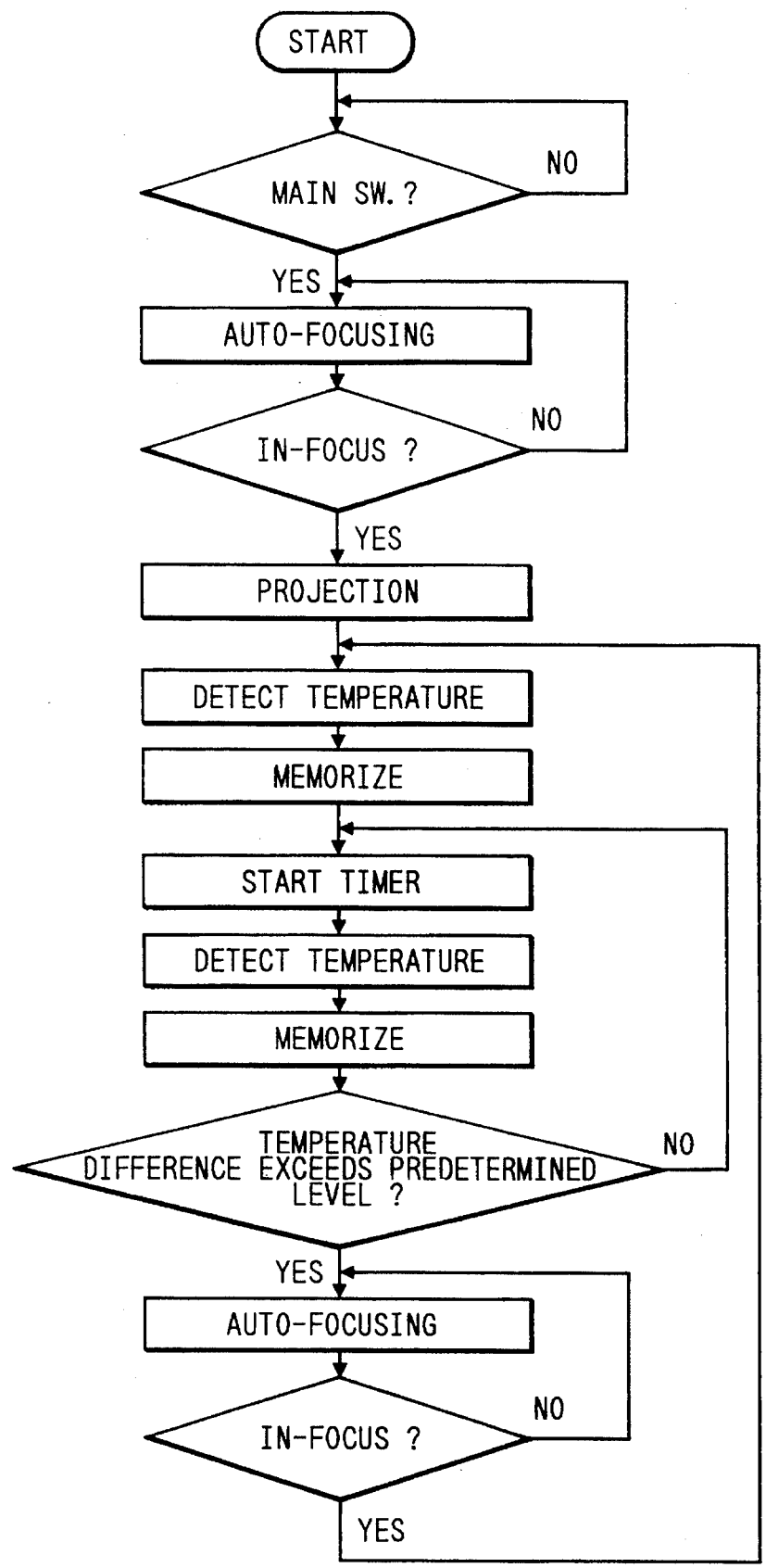
FIG. 34 is a flow chart.

FIG. 33 is a schematic block diagram showing the arrangement of a control system according to still another embodiment of the present invention, and FIG. 34 is a flow chart showing the operation of the control system. In this embodiment, a timer is added to the arrangement of the above embodiment, and the temperature of the projection lens 166 is measured at predetermined time intervals determined by the timer. Since the temperature of the projection lens 166 is measured at predetermined time intervals using the timer, an unnecessary auto-focus operation can be prevented.

Figure 35:
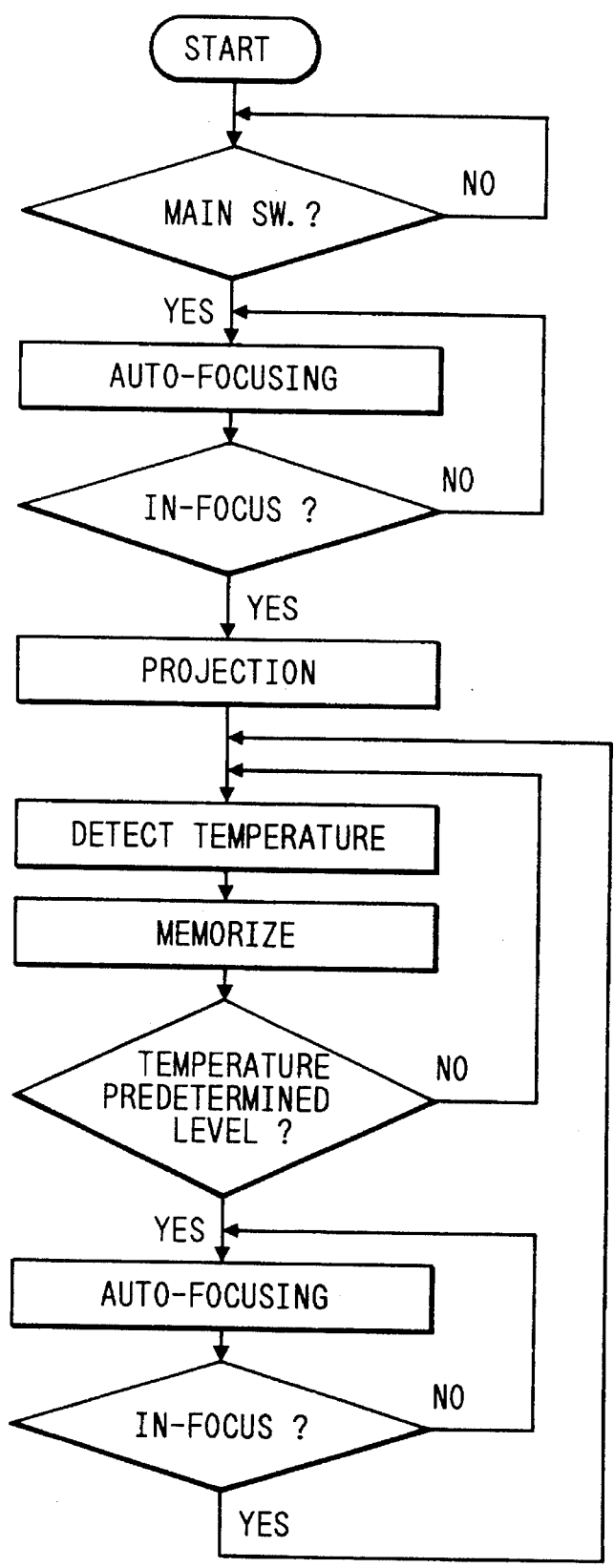
FIG. 35 is a flow chart.

FIG. 35 is a flow chart showing the operation of a control system according to still another embodiment of the present invention. In this embodiment, when the detected temperature of the projection lens 166 is a predetermined temperature (e.g., values at 10° C. intervals between 0° C. and 100° C.), an auto-focus operation is performed. When the detected temperature is equal to a temperature obtained when the immediately preceding auto-focus operation is performed, the auto-focus operation is not performed.

Figure 36:
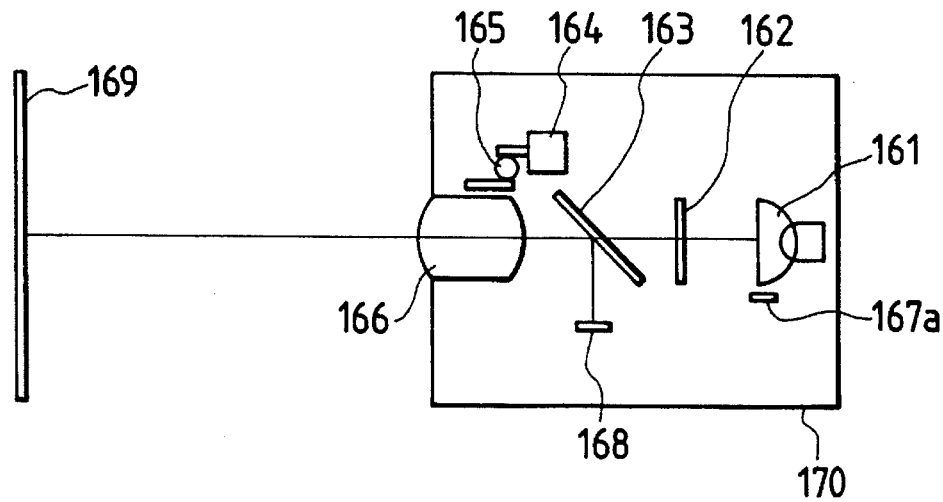
FIG. 36 is an optical sectional view showing another embodiment of the present invention.

FIG. 36 shows the arrangement of a control system according to still another embodiment of the present invention. The same reference numerals in FIG. 36 denote the same parts as those in the embodiment described with reference to FIG. 30. In FIG. 36, a temperature sensor 167a detects the temperature of a light source 161. In this embodiment, a change in temperature of the light source 161 is detected by the temperature sensor 167a, and when the change in temperature exceeds a predetermined value, an auto-focus operation is performed.

Figure 37:
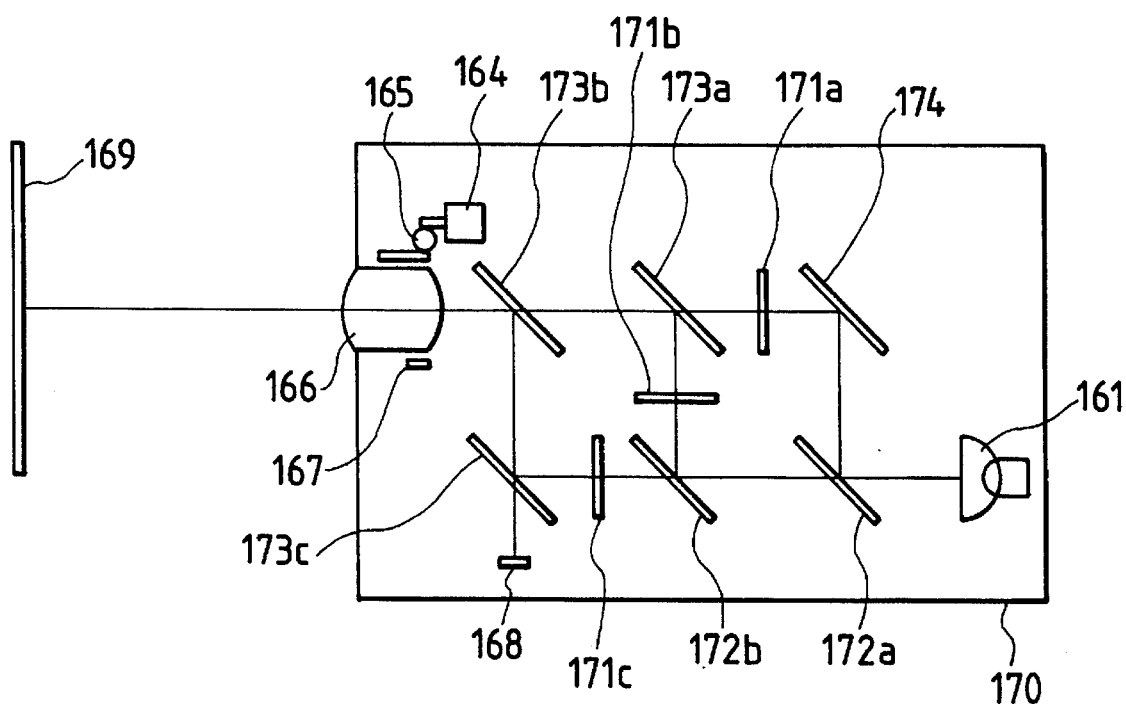
FIG. 37 is an optical sectional view showing another embodiment of the present invention.
Figure 38:
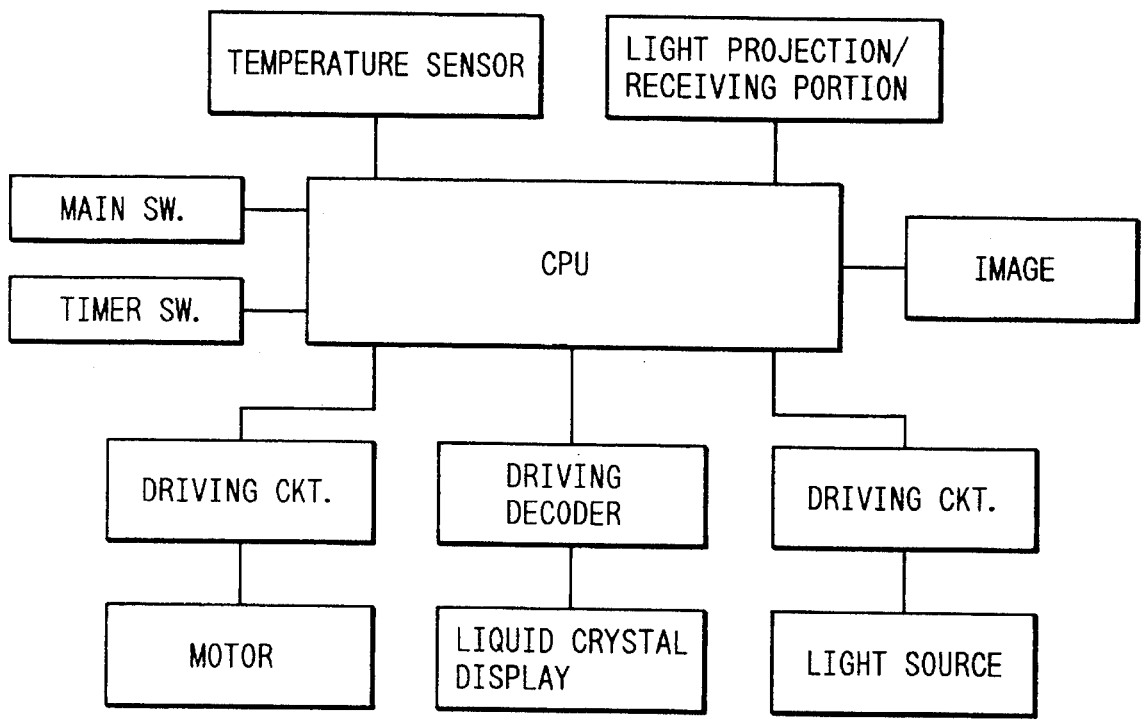
FIG. 38 is a block diagram.
Figure 39:
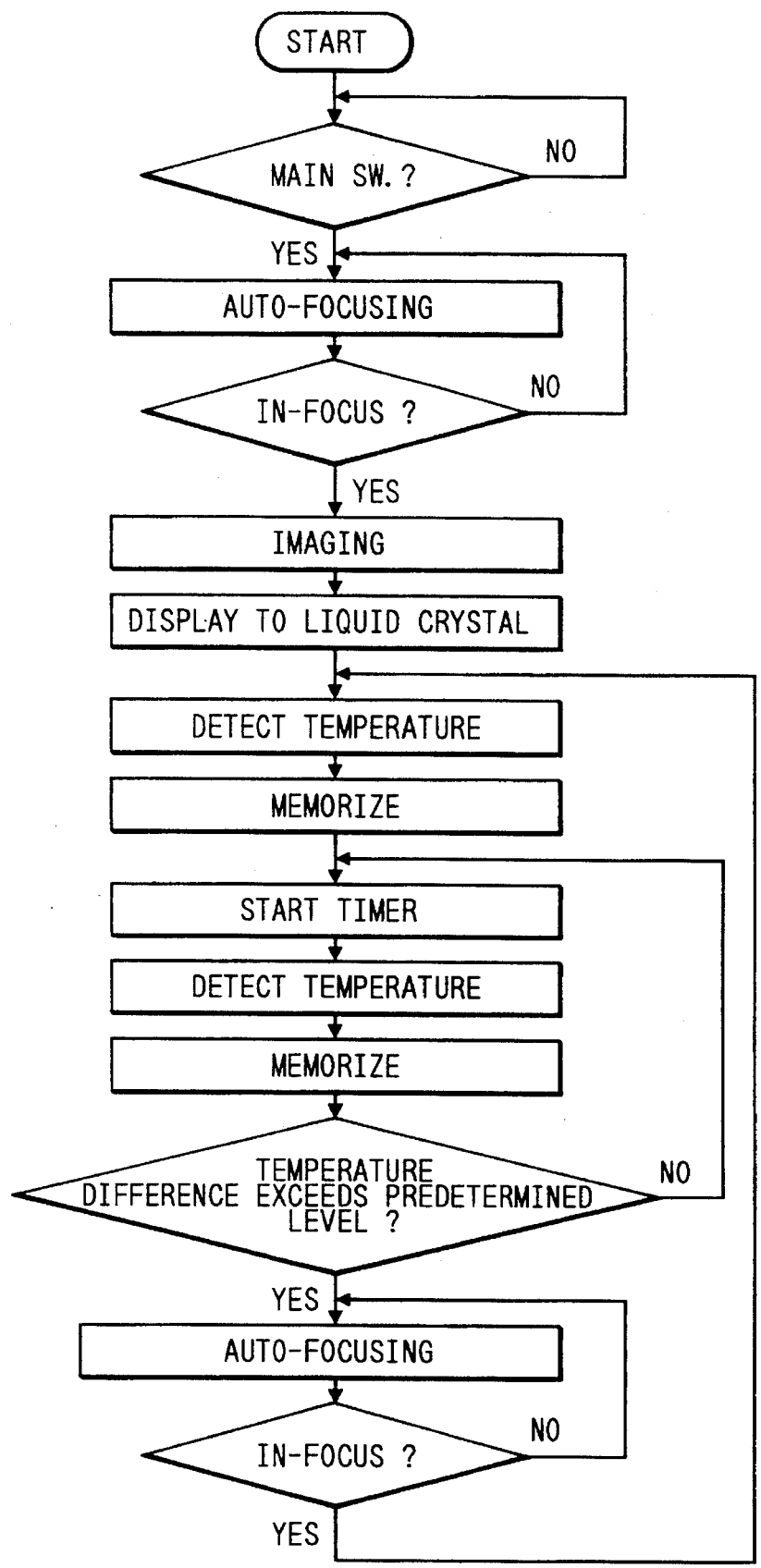
FIG. 39 is a flow chart.

FIGS. 37 to 39 show still another embodiment of the present invention. In this embodiment, the present invention is applied to an LCD projector. The same reference numerals in FIG. 37 denote the same as those in the embodiment described with reference to FIG. 30. The projector shown in FIG. 37 comprises an LCD 171a corresponding to green light, an LCD 171b corresponding to blue right, an LCD 171c corresponding to red light, a dichroic mirror 172a for reflecting only green light of light projected from a light source 161, a dichroic mirror 172b for reflecting only blue light, a half mirror 173a for mixing light transmitted through the LCD 171a and light transmitted through the LCD 171b, a half mirror 173c for reflecting light transmitted through the LCD 171c, a half mirror 173b for mixing light from the half mirror 173a and light from the half mirror 173c, and a mirror 174 for reflecting light reflected by the dichroic mirror 172a. Only green light of light projected from the light source 161 is reflected by the dichroic mirror 172a. The reflected green light is reflected by the mirror 174, and is transmitted through the LCD 171a. Only blue light of the light transmitted through the dichroic mirror 172a is reflected by the dichroic mirror 172b. The reflected blue light is transmitted through the LCD 171b. The green light transmitted through the LCD 171a and the blue light transmitted through the LCD 171b are mixed by the half mirror 173a. The light transmitted through the dichroic mirror 172b is transmitted through the LCD 171c, is reflected by the half mirror 173c, and is mixed by the half mirror 173b with the light mixed by the half mirror 173a. The mixed light is then projected onto a screen 169 through a projection lens 166.

Like in the above embodiment, the temperature of the projection lens 166 is detected by a temperature sensor 167, and when a change in temperature exceeds a predetermined value, an auto-focus operation is performed, thus correcting a focusing state.

Figure 40:
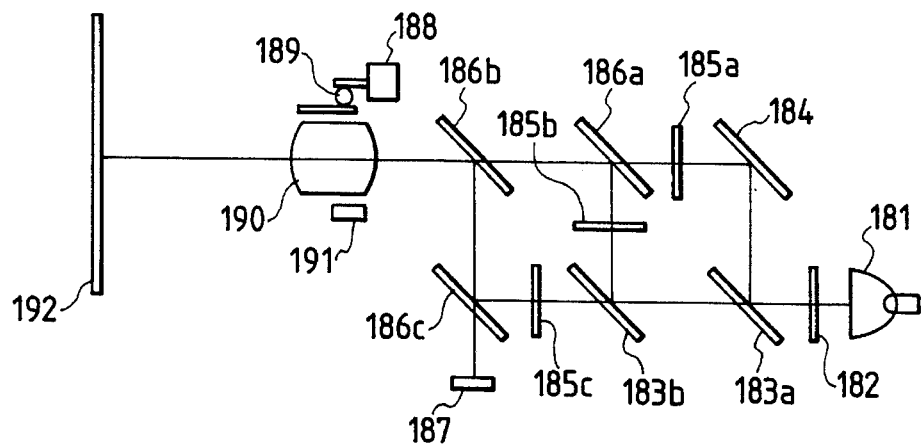
FIG. 40 is an optical sectional view.

A projector shown in FIG. 40 includes a lamp 181 as a light source, and a heat absorbing filter 182. A dichroic mirror 183a reflects only green light. The reflected green light is reflected by a total reflection mirror 184, and is incident on an LCD 185a. A dichroic mirror 183b reflects only red light. The reflected red light is transmitted through an LCD 185b, and is mixed with the green light by a half mirror 186a.

Blue light transmitted through the dichroic mirror 183b is transmitted through an LCD 185c, and is reflected by a half mirror 186c. The reflected light is mixed with the mixed light of the green and red light components by a half mirror 186b. The mixed light is projected onto a screen 192 through a projection lens 190.

On the other hand, a lens control circuit 191 (including a timer circuit) issues a driving command to a driving motor 188 on the basis of distance information from a distance detector 187, and focus adjustment of the projection lens is performed by a driving system 189.

Figure 42:
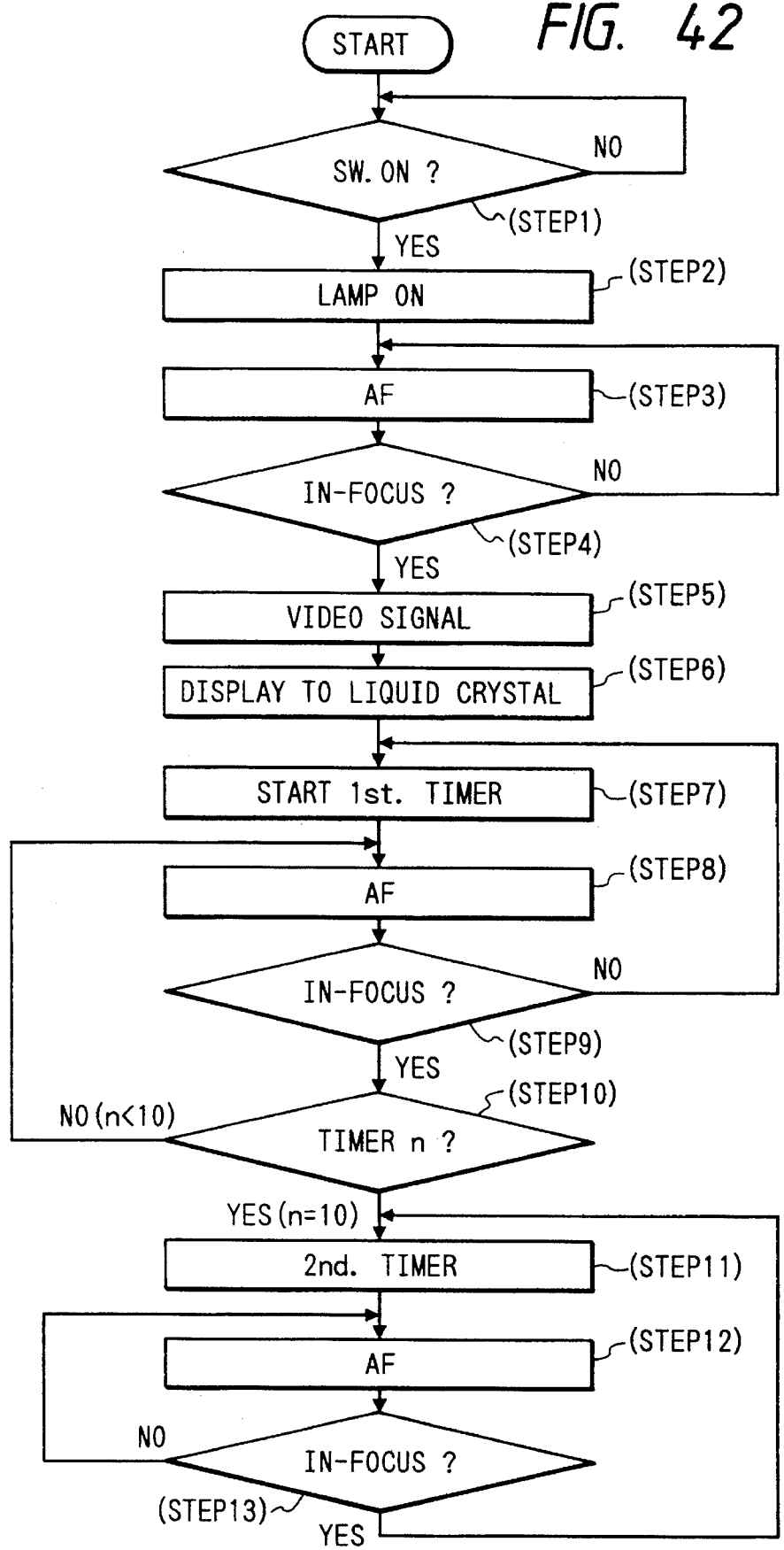
FIG. 42 is a flow chart.

FIG. 41 shows the arrangement of a control system of the projector of this embodiment, and FIG. 42 shows the control operation of the control system.

When an SW 195 is ON (step 1), a μ-com 196 issues a command to a driving circuit 194 to turn on the lamp 181 (step 2), thereby performing an active AF operation (step 3). Light projected from the distance detector 187 onto the screen 192 through the half mirrors 186b and 186c, and the projection lens 190 is reflected by the screen, and is measured by the distance detector 187 along the same optical path, thus performing focus adjustment.

When an "in-focus" state is attained by the AF operation (step 4), a video signal is supplied to the LCDs 185a to 185c through the driving circuit 197 (step 5), and is projected onto the screen 192 (step 6). At the same time, a first timer is started (step 7), so that an AF operation (step 8) is repeated at, e.g., 1-minute intervals to maintain an in-focus state (step 9). After the AF operation is repeated 10 times (step 10), a second timer is started (step 11) so as to repeat an AF operation (step 12) at, e.g., 30-minute intervals. This state is repeated until the SW 195 is OFF. As a result, a defocusing state over time can be automatically corrected, and a stable image can be obtained.

Figure 43:
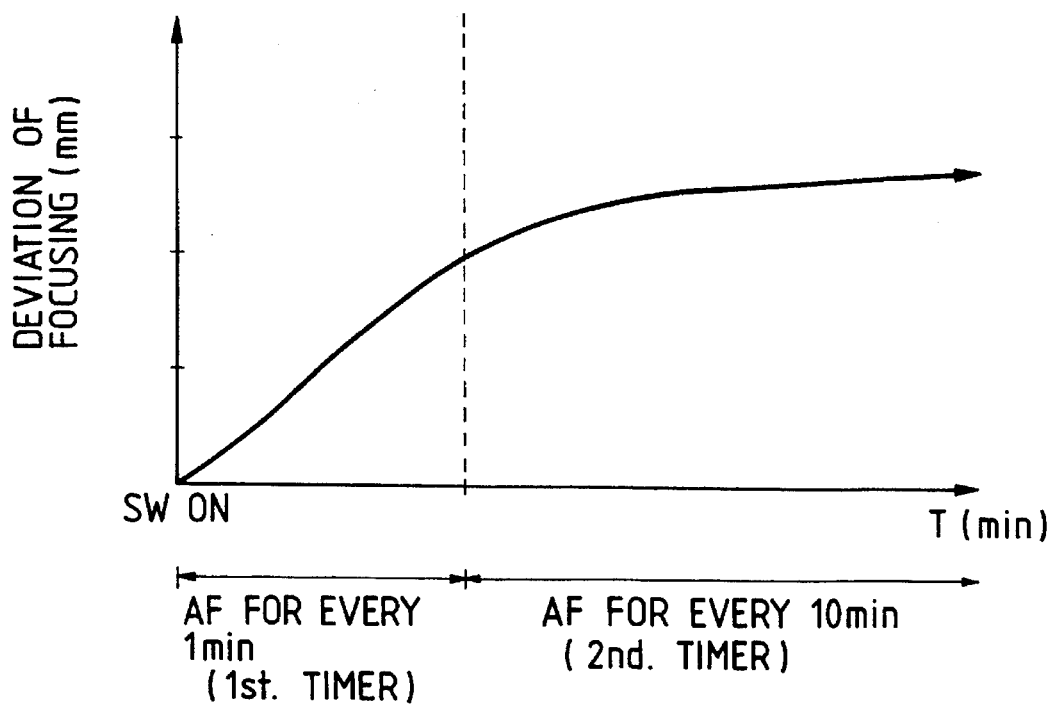
FIG. 43 is a graph.

FIG. 43 exemplifies the first and second timers. The reason why the first and second timers are set as described above is that a change in temperature becomes small after an elapse of a predetermined period of time. The first and second timers may be set to have various times depending on the contents of apparatuses.

Figure 44:
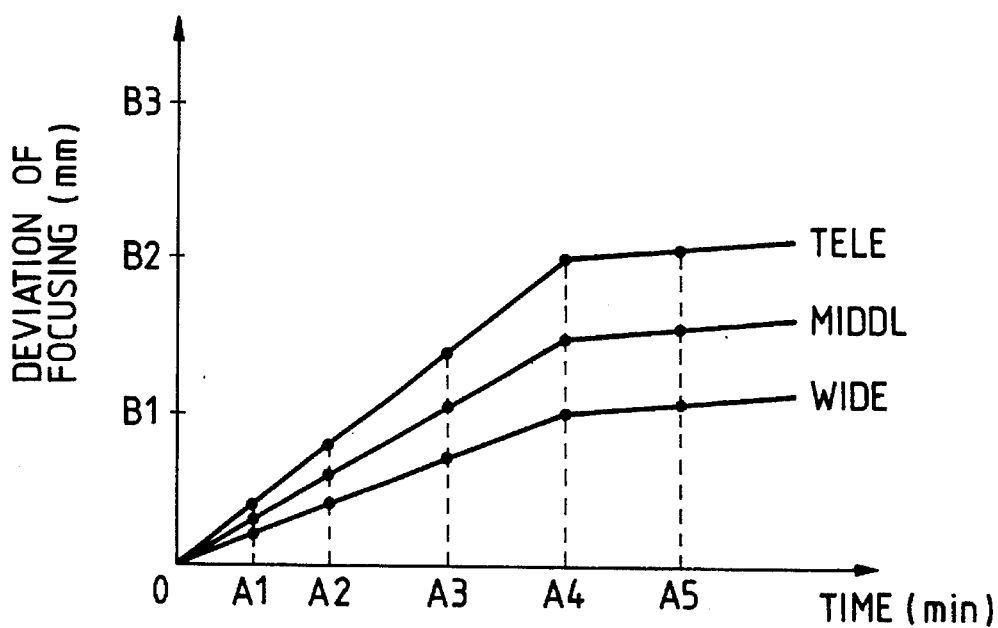
FIG. 44 is a graph.

FIG. 44 shows the basic principle according to still another embodiment of the present invention.

The basic arrangement of this embodiment of the present invention is the same as that in the above embodiment. In the above embodiment, distance measurement is repeated at predetermined time intervals using the timers to obtain the best image. This embodiment is based on a method of memorizing the deviation of focusing at predetermined time intervals according to the zoom ratio as shown in FIG. 44 in a microcomputer [in units of zoom areas (Tele, Middle, Wide), projection distance, etc].

More specifically, in this embodiment, a driving amount is read out from a memory at predetermined time intervals using a timer, and a focusing state is changed by the microcomputer through a driving circuit, thus automatically correcting a defocusing state. In this embodiment, a stable image can always be obtained.

Figure 45:
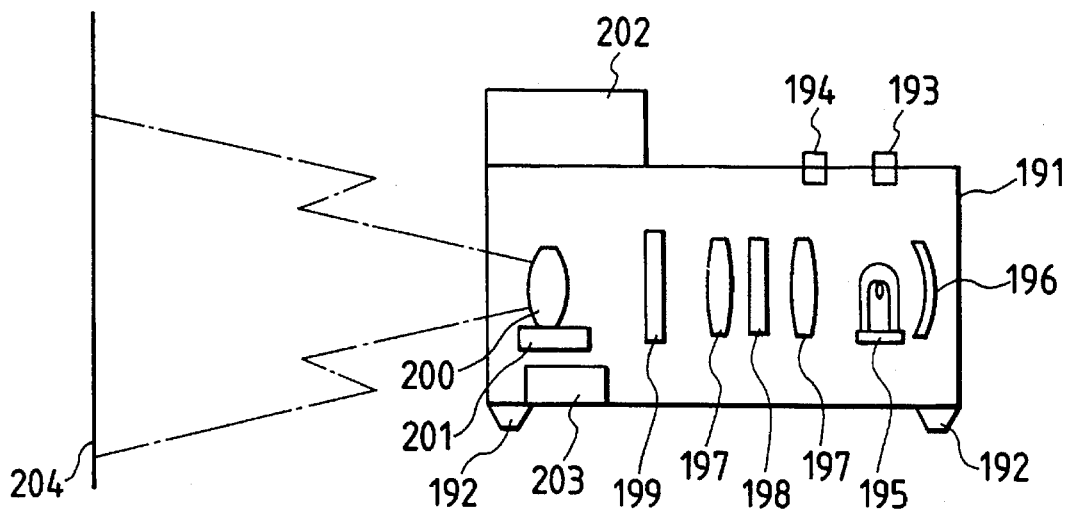
FIG. 45 is an optical sectional view.

FIG. 45 is a schematic view showing still another embodiment of the present invention.

An apparatus shown in FIG. 45 comprises a casing 191 having four legs 192, a lamp switch 193 arranged on the casing 191, a focus switch 194 arranged on the casing 191, a light source lamp 195 for projecting an image, a reflector 196, a condenser lens 197, an anti-heat filter 198, a transmission type liquid crystal display 199, a projection lens 200 mounted on an in-focus mechanism 201, a distance measuring device 202, based on the known triangulation principle used in a camera, for projecting infrared light, detecting light reflected by an object using a light-receiving element, and measuring a distance to the object, an acceleration sensor 203 for outputting a signal according to an acceleration acting on the projection apparatus, and a screen 204.

An operation of the apparatus will be described below.

When the lamp switch 193 is closed, the lamp 195 is turned on, and almost collimated light is incident on the liquid crystal display 199 through the reflector 196 and the condenser lens 197. The anti-heat filter 198 is used for cutting infrared light, and prevents the liquid crystal display 199 from being thermally deteriorated. When a video signal is supplied to the liquid crystal display 199, the liquid crystal display 199 displays a television image. The projection lens 200 focuses an image displayed on the liquid crystal display 199 on the screen 204. The projection lens 200 is mounted on the in-focus mechanism 201, and is driven in the optical axis direction according to a signal from the distance measuring device 202. Thus, even when the distance between the projection lens and the screen is changed, an image can be focused on the screen 204. When the focus switch 194 is manually closed, an operator can operate the focusing mechanism at an arbitrary timing. The acceleration sensor 203 is fixed to the casing 191, and detects an applied acceleration. In recent years, a micro sensor in which a heavyweight is attached to the distal end of a piezoelectric element, and an acceleration is detected based on a voltage generated when the piezoelectric element is bent by the acceleration, has been developed, and can be utilized in this embodiment.

Figure 46:
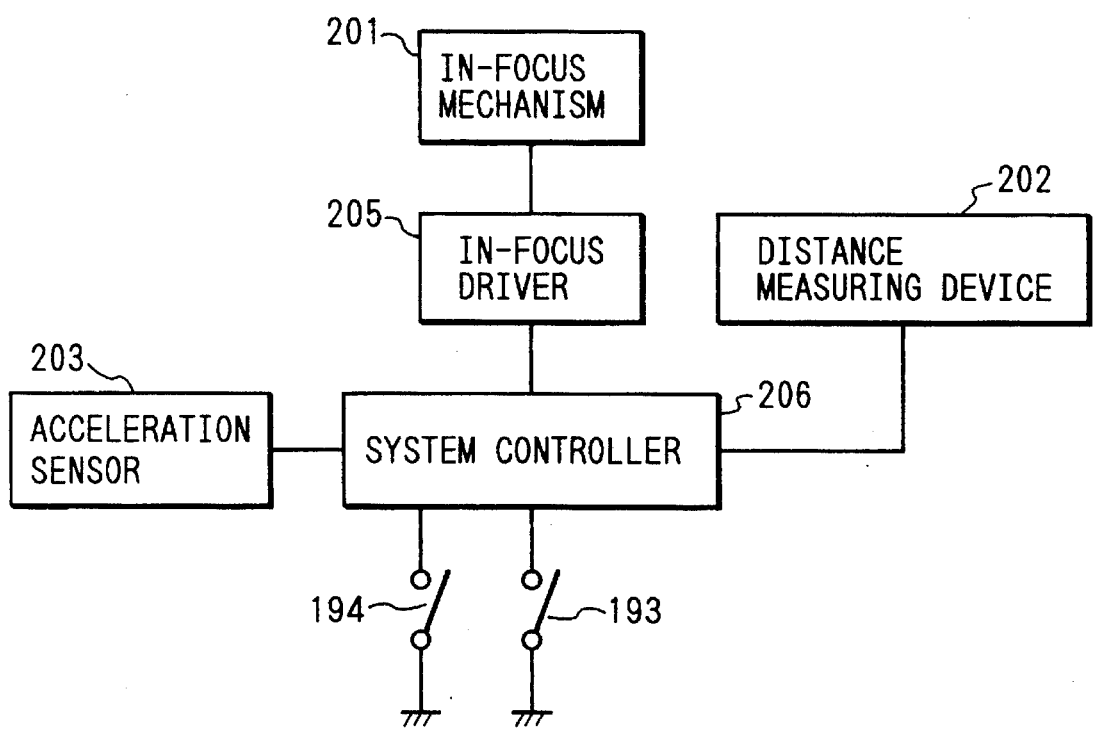
FIG. 46 is a block diagram.

FIG. 46 is a block diagram showing principal part, and shows a portion associated with an AF operation.

The same reference numerals in FIG. 46 denote the same parts as in FIG. 45.

An in-focus driver 205 corresponds to an electrical circuit portion for driving the in-focus mechanism 201.

A system controller 206 controls the entire system in the projection apparatus.

Figure 47:
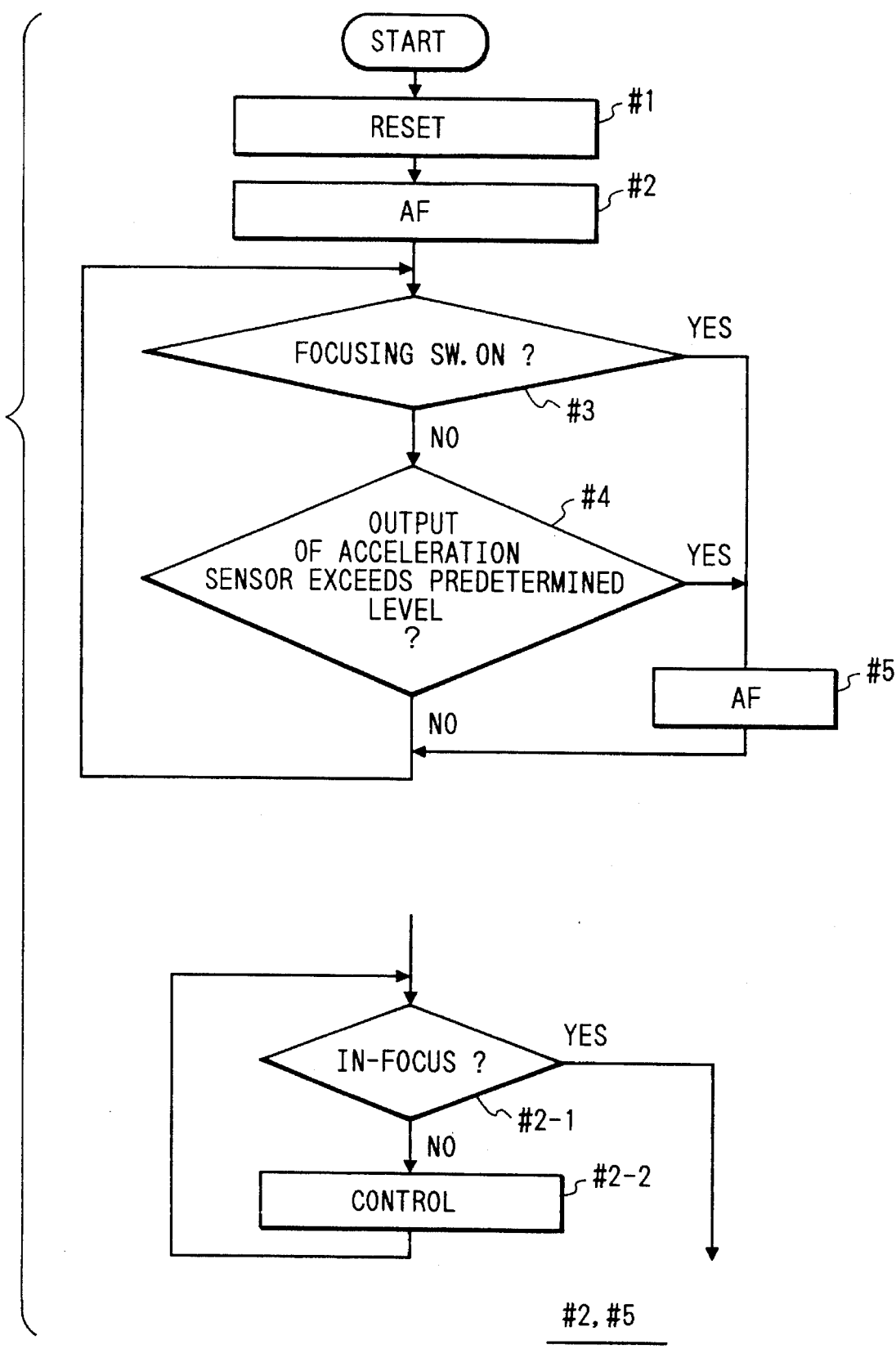
FIG. 47 is a flow chart.
Figure 48:
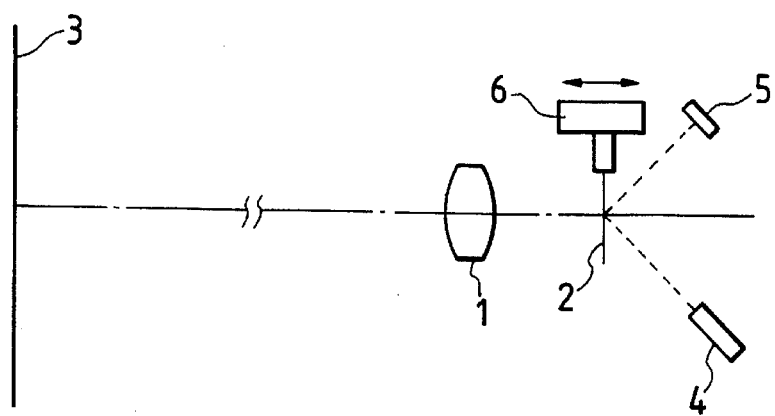
FIG. 48 is a view showing an optical arrangement.

FIG. 47 is a flow chart showing an AF operation.

When the lamp switch 193 is closed, the system is reset (#1), and an AF operation is performed (#2). It is checked based on the output from the distance measuring device 202 if an in-focus state is attained (#2-1). If it is determined that an in-focus state is attained, the operation of the distance measuring device 202 is stopped. Thus, power consumption can be saved. If it is determined that an in-focus state is not attained, the system controller 206 outputs a driving direction and a driving amount of the projection lens 200 to the in-focus driver 205 on the basis of data calculated by the system controller 206 according to the output from the distance measuring device 202, or data stored in advance in the system controller 206, and the in-focus mechanism 201 is driven to drive the projection lens to an in-focus position (#2-2). Then, the distance measuring device 202 is stopped. During the operation of the projection apparatus, the system controller 206 always detects the outputs from the focus switch 194 and the acceleration sensor 203 (#3, #4). When the focus switch 194 is intentionally closed by an operator, the flow branches to step #5, and the same AF operation as described above is performed. When the apparatus is unexpectedly moved during the operation of the projection apparatus, or when the apparatus is moved to change its location or to change the size of the screen, the output from the acceleration sensor 203 exceeds a predetermined value, and the flow branches to step #5 to perform the AF operation.

As described above, the projection apparatus of this embodiment detects the movement of the apparatus by the acceleration sensor. When it is determined that the apparatus is moved, the AF operation is automatically performed. Therefore, once the apparatus is set, no operation is required.

What is claimed is:

1. A projection type display apparatus for projecting an original image, comprising:

a light source for illuminating the original image;

a projection optical system for projecting the illuminated original image onto a projection surface, wherein light reflected by the projection surface is extracted from a position at an original image side of said projection optical system or in said projection optical system;

focus detection means, which receives the extracted light, for detecting focus of said projection optical system; and guiding means for guiding light to said focus detecting means, said guiding means having an average attenuation ratio of light in a wavelength range between 450 nm and 650 nm of the light emerging from the projection original image of not more than 25%, and guiding the light reflected by the projection surface to said focus detection means.

2. A projection type display apparatus for projecting an original image, comprising:

a light source for illuminating the original image;

a projection optical system for projecting the illuminated original image onto a projection surface, wherein light reflected by the projection surface is extracted from a position at an original image side of said projection optical system or in said projection optical system;

focus detection means, which receives the extracted light, for detecting focus of said projection optical system; and light guiding means, having optical elements disposed between said projection light source and said projection lens, wherein light projected from said projection lens includes some light components having a wavelength of not less than 700 nm, said light guiding means arranged in said projection lens or closer to a side of the projection original image than said projection lens for guiding at least some components having a wavelength of not less than 700 nm to said focus detection means.

3. An apparatus according to claim 2, wherein said light guiding means comprises an optical element having an average attenuation ratio of light in a wavelength range between 450 nm and 650 nm of light for projecting the projection original image of not more than 25%.

4. An apparatus according to claim 2, further comprising a color separation system for separating light emitted from said projection light source into a plurality of color light components, means for guiding the separated color light components to projection original images corresponding in number to the separated color light components, means for mixing images of the plurality of color light components by a color mixing system, and means for projecting the mixed image by a projection lens, and a mirror, arranged closer to a side of said projection lens than the projection original images, and is not involved in color mixing, comprising said light guiding means.

5. A projection type display apparatus projecting an original image, comprising:

light source means for emitting light on the original image;

a projection lens projecting the original image onto a projection surface, wherein light is reflected by the projection surface and received by said projection lens;

a focus detection light receiving unit to perform focus detection; and a beam splitter arranged in said projection lens or between said projection lens and the projected original image, wherein said beam splitter comprises a polarization beam splitter.

6. An apparatus according to claim 5, further comprising light guiding means for guiding light reflected from said projection original image to said focus detection light receiving unit to perform the focus detection.

7. An apparatus according to claim 5, further comprising optical elements disposed closer to a side of said projection light source than said polarization beam splitter, so that light incident on said polarization beam splitter is polarized light in a direction not to be shielded by said polarization beam splitter.

8. An apparatus according to claim 5, wherein the projection original image comprises a liquid crystal.

9. A projection type display apparatus, comprising:

a projection light source emitting light;

color separation means for separating the emitted light into a plurality of color light components, with the color light components being guided to projection original images corresponding in number to the number of separated color light components;

color mixing means for mixing the images of the plurality of color light components;

a projection lens projecting the mixed image;

a polarization beam splitter arranged in said projection lens or between said projection lens and said projection original images; and a focus detection device, including a light-receiving unit, for receiving light guided by said polarization beam splitter.

10. An apparatus according to claim 9, wherein said polarization beam splitter comprises a reflection member arranged between said projection lens and the projection original images, with said reflection member only reflecting light emerging from the projection original images and is not involved in color mixing.

11. An auto-focus system in a projection optical apparatus projecting a liquid crystal surface against a projection surface, comprising:

a focusing optical system for projecting an image reproduced on the liquid crystal surface onto the projection surface; and a focusing state detector for receiving image information on the projection surface, wherein said focusing optical system also serves as an optical system for inputting the image information on the projection surface to said focusing state detector.

12. A projection type display apparatus for projecting an original image, comprising:

a light source for illuminating the original image;

a projection optical system for projecting the illuminated original image onto a projection surface, wherein light reflected by the projection surface is extracted from a position at an original image side of said projection optical system or in said projection optical system;

focus detection means, which receives the extracted light, for detecting focus of said projection optical system; and said focus detection means is inserted proximate to said projection optical system only when focus detection is performed, and wherein focus detection light is projected or received through said projection optical system.

13. A projection type display apparatus for projecting an original image, comprising:

a light source for illuminating the original image;

a projection optical system for projecting the illuminated original image onto a projection surface, wherein light reflected by the projection surface is extracted from a position at an original image side of said projection optical system or in said projection optical system;

focus detection means, which receives the extracted light, for detecting focus of said projection optical system;

temperature sensitive detecting means for detecting a change induced by a change in temperature of at least one of said projection optical system and said projection light source; and auto-focus means for performing an auto-focus operation of said projection optical system according to an output from said temperature sensitive detection means.

14. An optical apparatus, comprising:

an optical system whose focal point can be moved;

auto-focus means for performing an auto-focus operation on said optical system;

a heat generating source such as a light source;

elapsed time detection means for measuring an elapsed time from the beginning of operation of said heat generating source; and focal point deviation correction means, arranged in said auto-focus means, for performing focus correction of said optical system according to an output from said elapsed time detection means.

15. A projection type display apparatus for projecting an original image, comprising:

a light source for illuminating the original image;

a projection optical system for projecting the illuminated original image onto a projection surface, wherein light reflected by the projection surface is extracted from a position at an original image side of said projection optical system or in said projection optical system;

focus detection means, which receives the extracted light, for detecting focus of said projection optical system;

auto-focus means for performing an auto-focus operation of said projection optical system;

acceleration detection means for detecting an acceleration acting on said projection optical system; and control means for, when a detection output from said acceleration detection means exceeds a predetermined value, causing said auto-focus means to perform the auto-focus operation.

* * * * *

UNITED STATES PATENT AND TRADEMARK OFFICE
CERTIFICATE OF CORRECTION

PATENT NO.   : 5,537,168
DATED        : July 16, 1996
INVENTOR(S)  : Kitagishi et al.

It is certified that error appears in the above-indentified patent and that said Letters Patent is hereby corrected as shown below:

COLUMN 3:

Line 53, "FIG. 23" should read --FIG. 22 is an optical sectiona view showing another embodiment of the present invention; ¶ FIG. 23--.

COLUMN 9:

Line 33, "Joint" should read --joint--.

Signed and Sealed this

Eleventh Day of February, 1997

Attest:

BRUCE LEHMAN

Attesting Officer

Commissioner of Patents and Trademarks